(12) United States Patent
Imajima et al.

(10) Patent No.: US 6,211,901 B1
(45) Date of Patent: *Apr. 3, 2001

(54) VIDEO DATA DISTRIBUTING DEVICE BY VIDEO ON DEMAND

(75) Inventors: Yoshiaki Imajima; Yuji Hashimoto, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/650,985

(22) Filed: May 21, 1996

(30) Foreign Application Priority Data

Jun. 30, 1995 (JP) .................................................. 7-165767

(51) Int. Cl.[7] ..................................................... H04N 7/18
(52) U.S. Cl. .................................. 348/7; 348/8; 348/10; 348/12
(58) Field of Search .............................. 455/4.2, 4.1, 5.2, 455/7, 5.1, 6.1, 6.3; 348/6, 7, 8, 10, 12; 370/76, 73

(56) References Cited

U.S. PATENT DOCUMENTS

| | | | |
|---|---|---|---|
| 5,357,276 | * 10/1994 | Banker et al. | 348/7 |
| 5,453,779 | * 9/1995 | Dan et al. | 348/7 |
| 5,583,937 | * 12/1996 | Ullrich et al. | 380/20 |
| 5,608,448 | * 3/1997 | Smoral et al. | 348/7 |
| 5,631,694 | * 5/1997 | Aggarwal et al. | 348/7 |
| 5,682,597 | * 10/1997 | Ganek et al. | 455/4.2 |
| 5,706,048 | * 1/1998 | Davis | 348/12 |
| 5,724,646 | * 3/1998 | Ganek et al. | 348/7 |
| 5,768,681 | * 6/1998 | Dan et al. | 455/5.1 |
| 5,771,435 | * 6/1998 | Brown | 455/5.1 |
| 5,793,971 | * 8/1998 | Fujita et al. | 348/7 |

FOREIGN PATENT DOCUMENTS 63-311891   12/1988 (JP) .

* cited by examiner

Primary Examiner—Andy Rao
(74) Attorney, Agent, or Firm—Staas & Halsey LLP

(57) ABSTRACT

A requested title recognizing mechanism recognizes the title of a video requested by the subscriber. A VOD service state monitoring mechanism determines whether or not the broadcast of the video is to be provided in the FVOD or the NVOD service, and if there is any available channel for the broadcast. If the broadcast has not been switched from the FVOD service to the NVOD service, then a busy state monitoring mechanism checks the number of the current simultaneous subscribers for the video. If the number is equal to or larger than a threshold, then the busy state monitoring mechanism instructs an NVOD service providing mechanism to broadcast the requested video in the NVOD service. If the number is smaller than the threshold, then the busy state monitoring mechanism instructs an FVOD service providing mechanism to broadcast the requested video in the FVOD service.

14 Claims, 20 Drawing Sheets

(1) VOD SERVICE INITIAL MENU

VOD SERVICE MENU
- FVOD SERVICE
- NVOD SERVICE

↓ (2) SELECTING FVOD SERVICE (3) CATEGORY SELECTION IMAGE

| LATEST PROGRAM | WEEKLY BEST 10 | ANIMATION |
| FOREIGN MOVIES | DOMESTIC MOVIES | OTHERS |

↓ (4) SELECTING LATEST PROGRAM (5) TITLE SELECTION SCREEN

LATEST PROGRAMS
- B : BEVERLY HILLS COP III
- BEAUTY AND THE BEAST
- BEETHOVEN II
- J : JURASSIC PARK
- L : LOVE SONG FOR ANGEL II
- N : NEVER ENDING STORY III
- S : SPEED

↓ (6) SELECTING "SPEED"

(7) LATEST PROGRAMS

PREVIEW
⟨PREVIEW SCREEN⟩
CANCEL    OK

→ IF BUSY LEVEL IS HIGH, SUBSCRIBER'S REQUEST MAY BE REJECTED

FIG. 3 PRIOR ART (1) VOD SERVICE INITIAL MENU

VOD SERVICE MENU
- FVOD SERVICE
- NVOD SERVICE (2) SELECTING NVOD SERVICE (3) CATEGORY SELECTION IMAGE

| LATEST PROGRAM | WEEKLY BEST 10 | ANIMATION |
| FOREIGN MOVIES | DOMESTIC MOVIES | OTHERS |

(4) SELECTING LATEST PROGRAMS (5) TITLE SELECTION IMAGE

BROADCAST SCHEDULE FOR LATEST PROGRAMS

| B : | BEVERLY HILLS COP III | 12:20 | 12:40... |
|     | BEAUTY AND THE BEAST  | 12:25 | 12:45... |
|     | BEETHOVEN II          | 12:30 | 12:35... |
| J : | JURASSIC PARK         | 12:20 | 12:40... |
| L : | LOVE SONG FOR ANGEL II| 12:30 | 12:50... |
| N : | NEVER ENDING STORY III| 12:35 | 12:55... |
| S : | SPEED                 | 12:25 | 12:45... |

→ SCHEDULE SHOULD BE PREDETERMINED (FIXED) BY OPERATOR (6) SELECTING "SPEED"

(7) "SPEED" STARTS AFTER OO MINUTES. OK?

⟨PREVIEW SCREEN⟩

[CANCEL] [OK]

(8) SELECTING "OK"

FIG. 5 PRIOR ART

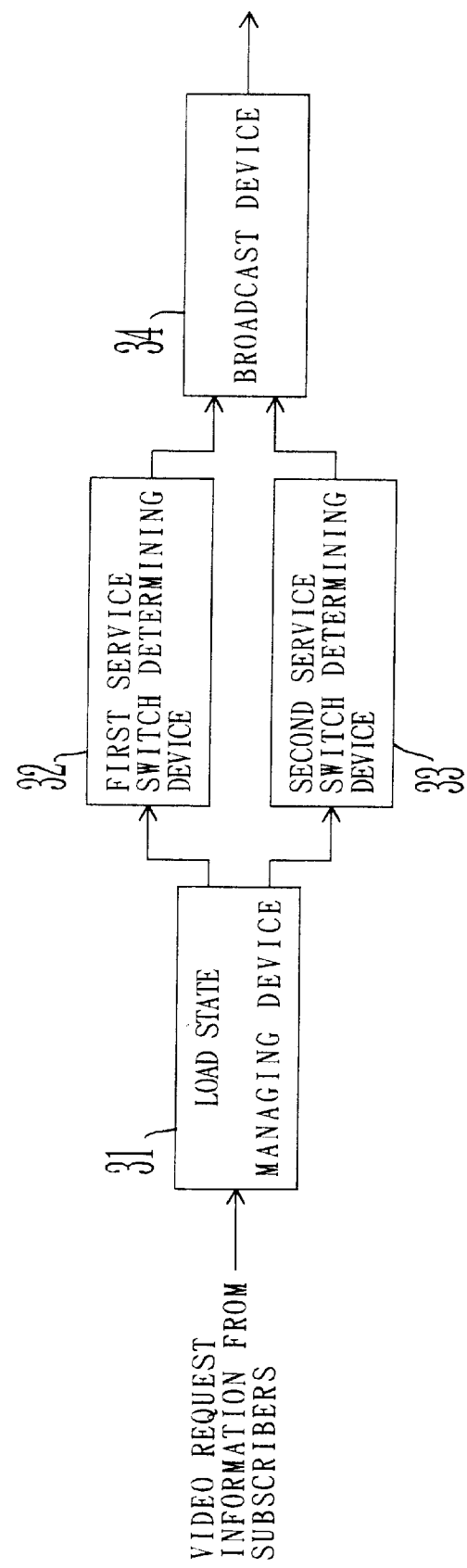
F I G. 9

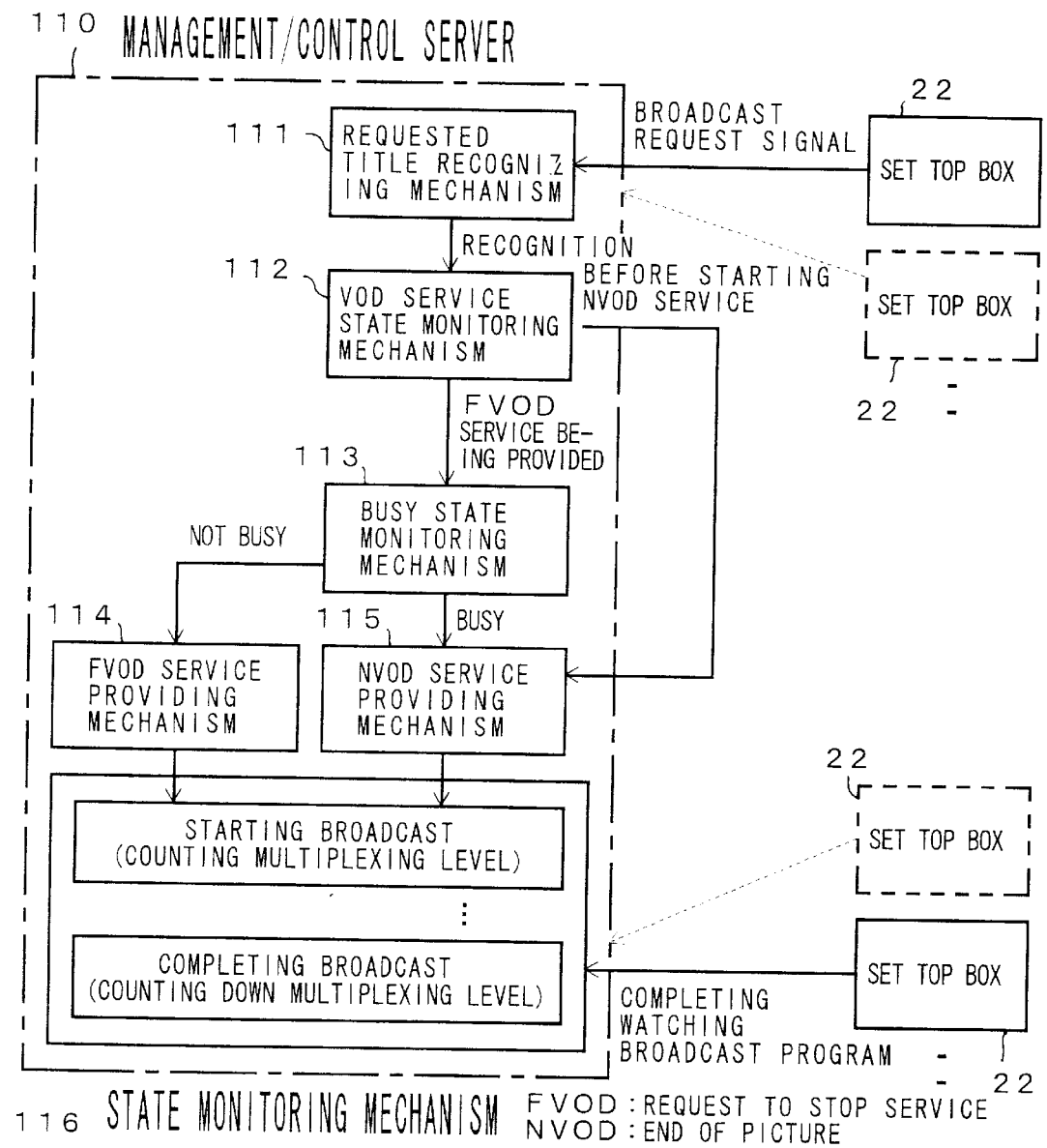
F I G. 15

(1) CATEGORY SELECTION SCREEN
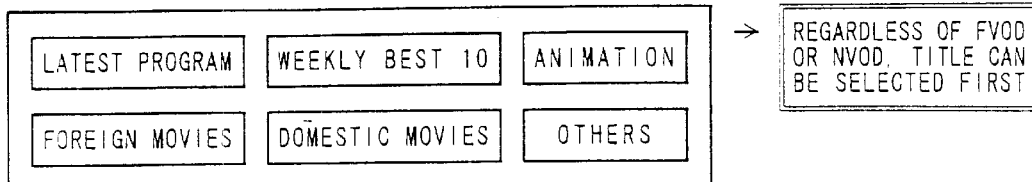
→ REGARDLESS OF FVOD OR NVOD, TITLE CAN BE SELECTED FIRST
(2) SELECTING LATEST PROGRAMS
(3) TITLE SELECTION SCREEN
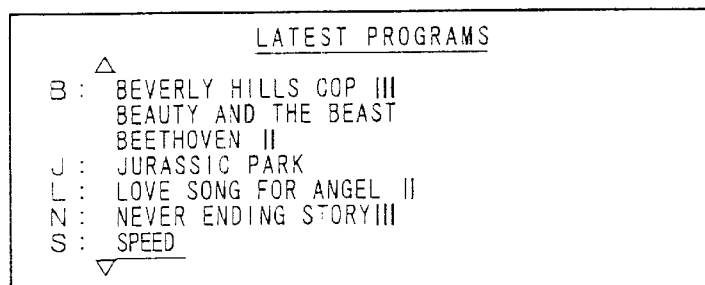
(4) SELECTING "SPEED"
(5)
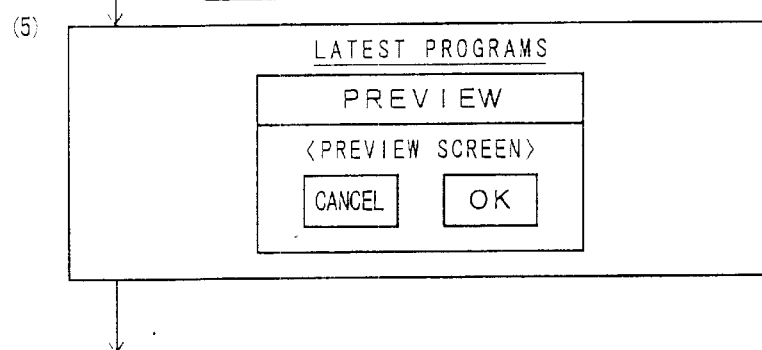
FIG. 17

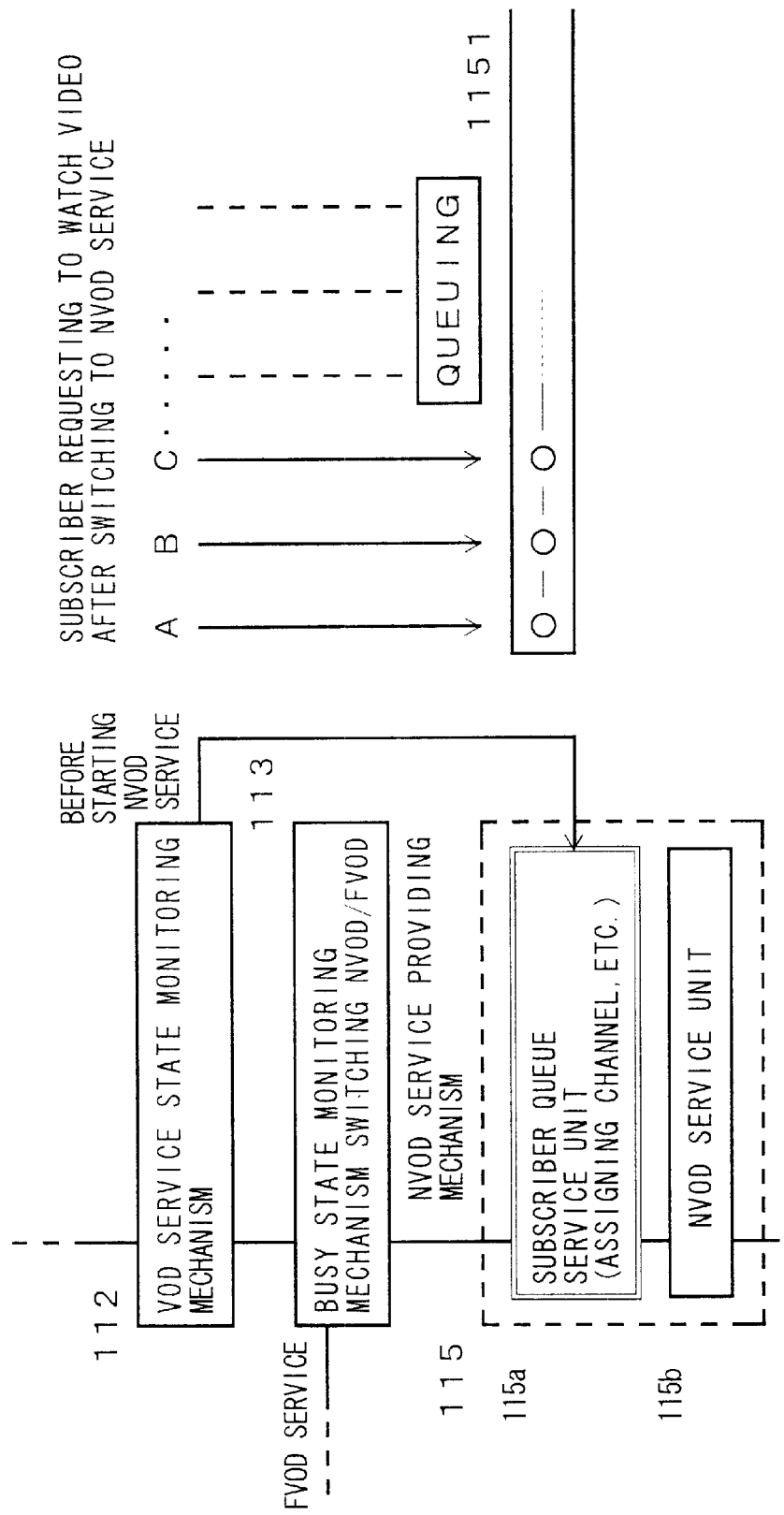
F I G. 19B
F I G. 19A

VIDEO DATA DISTRIBUTING DEVICE BY VIDEO ON DEMAND

BACKGROUND OF THE INVENTION

Field of the Invention

The present invention relates to a video-on-demand service and more specifically to a system of effectively controlling the video-on-demand service.

With the increasing popularity of cable television (CATV), a lot of video-on-demand services have been provided for subscribers through CATV networks.

The video-on-demand (hereinafter referred to as VOD) service is an interactive system for transmitting video data, requested by a subscriber through a terminal device called a set top box (STB) mounted in each subscriber's home, from the CATV center that stores films pictures identified by plural titles.

The above described CATV center is connected to a plurality of CATV subscribers' homes to distribute video data to the subscribers along a plurality of video channels over the CATV network. The CATV center reads using the built-in video server the video data requested by the subscriber from the video storage device, digitally modulates the video data, and distributes the data to the subscribers' homes through the CATV network. The video data distributed to the subscribers are demodulated by the STB at the subscribers' homes and displayed on the screens of the TV receivers.

The VOD service can be either an NVOD (near video on demand) service or an FVOD (full video on demand) service. The NVOD service has been realized in the U.S. while the FVOD service is being developed in many other countries.

The FVOD service is a service through which the subscribers can immediately request and watch a desired program recorded on video. At the request of a subscriber, the requested video is played immediately. The subscriber can also exclusively watch a specified program recorded on video. Therefore, the FVOD service, as with the home video tape recorder and video disk, enables the subscriber to not only play but also fast-forward, rewind, and pause the video. To realize these capabilities, the FVOD service requires use of an exclusive channel for each subscriber.

On the other hand, the NVOD service is also referred to as a time shift service, that is, it broadcasts a program recorded on a video along plural channels at predetermined time intervals. Practically, 6 channels are used to start broadcasting a 2-hour program at 20-minute intervals. The subscribers can watch the program from the beginning by waiting for 20 minutes at most.

The FVOD and NVOD services are described below by referring to the flowcharts shown in FIGS. 1 and 2.

FIG. 1 is a flowchart showing the outline of the services through the FVOD service.

The subscriber selects a desired title from a plurality of titles provided by the FVOD service and displayed on the screen of a television receiver using his or her own STB. The STB transmits the signal indicating a request to watch the program identified by the selected title (S1) to the CATV center through the CATV network.

When the CATV center receives the request signal through the CATV network, it recognizes the title requested by the subscriber (S2).

Using the internal busy-management mechanism, the CATV center calculates the current busy level of the video server for performing a stream process on the video data of the program identified by the requested title (S3).

The busy level can be represented by, for example, the number of current accessing operations to a video server. The video server places a limitation on the number of subscribers who can be simultaneously provided with the FVOD service depending on the video data transmission capabilities of the CPU, data transfer capabilities of the video storage device that stores the video data, and the data transfer speed of the bus connecting the CPU with the video storage device. Therefore, a threshold for the number of subscribers simultaneously watching a program is preliminarily set in the video server. When a new request is received and the busy level exceeds the threshold for the number of the audiences simultaneously enjoying the program, the video server is in a busy state in which video data cannot be distributed to the new subscriber.

If it is determined by the busy management mechanism that the video server is not in the busy state, the CATV center assigns to the subscriber a video channel for distributing the video data requested by the subscriber, and transmits the video channel information to the STB of the subscriber through the CATV network (S4).

Upon receipt of the above described video channel information, the STB sets his or her receiving channel to the channel number specified in the information.

Then, the CATV center reads from the video storage device the video data having the title specified by the subscriber. After being digitally-modulated, the video data is transmitted to the STB through the CATV network (S5).

Thus, the subscriber can watch the video data through the FVOD service.

If it is determined in step S3 that the CATV center is busy, it transmits to the subscriber's STB through the CATV a message that the request cannot be accepted (S6).

Therefore, the subscriber cannot watch the desired video data.

FIG. 2 is a flowchart showing the outline of the NVOD service.

The subscriber selects a desired title from a plurality of titles provided in the NVOD service and displayed on the screen of the television receiver using his or her STB. The STB transmits to the CATV center through the CATV network the signal indicating the request to watch the video data having the selected title (S11).

When the CATV center receives the request signal through the CATV network, it recognizes the title requested by the subscriber (S12).

The CATV center assigns to the subscriber a video channel for distributing the video data requested by the subscriber, and transmits the video channel information to the STB of the subscriber through the CATV network. The STB sets his or her receiving channel to the channel number specified by the information (S13).

When it is time to broadcast the requested program, the CATV center reads the subscriber-requested video data from the video server, digitally modulates the data, and distributes through the CATV network the data along the channel assigned to the subscriber (S14).

Thus, the subscriber can request and watch the program recorded on video at a predetermined time.

The FVOD service is described below more practically by referring to FIGS. 3 and 4.

The initial menu of the VOD service is displayed on the screen of the television receiver through the STB at the subscriber's home as shown by (1) in FIG. 3. The subscriber selects the FVOD service on the screen through the STB ((2) shown in FIG. 3).

Then, the category selection screen indicated by (3) shown in FIG. 3 is displayed. When the subscriber selects the latest program on the screen through the STB ((4) in FIG. 3), the title selection screen is displayed as indicated by (5) in FIG. 3.

If the subscriber selects the film "Speed" on the screen through the STB ((6) in FIG. 3), then this program is displayed on the latest preview screen as shown by (7) in FIG. 3. If "Speed" has already been provided to a number of other subscribers, the CATV center may reject the request.

Then, the subscriber pushes the OK button on the preview screen through the STB ((8) in FIG. 4). Thus, "Speed" is distributed by the CATV center to the subscriber's STB, and "Speed" is played back on the screen of the subscriber's receiver ((9) in FIG. 4).

Next, the operations of the NVOD service are described more practically by referring to FIGS. 5 and 6.

The initial menu of the VOD service is displayed on the screen of the television receiver through the STB at the subscriber's home as shown by (1) in FIG. 5. The subscriber selects the NVOD service on the screen through the STB ((2) shown in FIG. 5).

Then, the category selection screen indicated by (3) shown in FIG. 5 is displayed. When the subscriber selects the latest program on the screen through the STB ((4) in FIG. 5), the latest program broadcast schedule screen is displayed as indicated by (5) in FIG. 5. On this screen, the video broadcast schedule is displayed in, for example, alphabetical order of the broadcast programs. The broadcast schedule is predetermined by the manager of the CATV center.

If the subscriber selects "Speed" on the screen through the STB ((6) in FIG. 5), then "Speed" is displayed on the preview screen as shown by (7) in FIG. 5. Additionally, the message, "Speed" will be broadcast after 00 minutes. Do you want to watch it?" is displayed on the preview screen. Furthermore, the CANCEL and OK buttons are displayed at the lower part of the preview screen.

If the subscriber pushes the OK button on the preview screen through the STB ((8) in FIG. 5), the service screen, etc. is displayed until "Speed" starts.

Thus, "Speed" is distributed after 00 minutes by the CATV distributing device to the subscriber's STB, and "Speed" is played back on the screen of the subscriber's receiver ((9) in FIG. 6).

Described below are some of the problems in the above described conventional VOD services.

FIG. 7 is a block diagram showing the outline of the problems.

When the subscriber requests and selects the video data, he or she should also select either the FVOD or NVOD service, thereby giving the subscriber a problem.

If the subscribers' requests concentrate on a specific program in the FVOD service, and if the concentration exceeds the limit of the video transmission capacity of the video server and the busy management mechanism determines too many requests, then the requests from some subscribers will be rejected, thereby failing to fully satisfy the subscribers.

In the NVOD service, the program is broadcast at predetermined time intervals regardless of whether any subscribers are watching the program. Therefore, if there is only a small number of subscribers, there is the possibility that no subscribers are watching the requested program at the start of a certain broadcast time. Some programs may be watched by no subscribers. This is a waste of the resources of the CATV center and therefore losses are incurred. The operation manager of the CATV service is required to organize the video programs and fix time schedules for the programs, which creates problems for the manager.

SUMMARY OF THE INVENTION

The present invention aims at providing a VOD service with easy operation without the need to select either the FVOD or NVOD service when a subscriber selects a desired video. The second object of the present invention is to realize a VOD service in which no request from a subscriber is rejected. Another object of the present invention is to realize a VOD service in which the broadcast is suppressed if there are no subscribers watching the program. A further object of the present invention is to realize a VOD service in which the load on the operation manager in the CATV center in organizing the VOD services can be reduced.

According to the present invention, the video data distributing device contains at least one video server having a video data storage device and a streaming unit. The video data storage device stores video data. The streaming unit reads the video data from the video data storage device to perform a video streaming process on the video data. The video data distributing device provides a subscriber with a video-on-demand service at the request from the subscriber. The video data distributing device comprises a load state management unit for managing the loads in the process of each video server; a service switch determining unit for determining, upon receipt of a video request from a subscriber, whether the broadcast of the requested video is to be serviced in a full-video-on-demand service or a near-video-on-demand service depending on the management information managed by the load state management unit. The video data distributing device also comprises a broadcast unit for broadcasting the requested video through the full-video-on-demand service or near-video-on-demand service to the subscriber according to the determination result from the service switch determining unit.

According to the present invention, the number of subscribers is collectively monitored by title in the FVOD service and NVOD service. The rejection of the requests from subscribers is avoided by accepting the requests from the subscribers after switching from the FVOD service to the NVOD service based on the audience demand. Thus, the subscribers can watch their desired video at any time.

Therefore, when a subscriber selects a desired program, he or she does not have to select either FVOD or NVOD service, thereby simplifying the video selecting operation. When there are no request received from any subscriber, video is not broadcast through the NVOD service to reduce the load on the video data distributing device.

Broadcasting video only when a request is received from a subscriber also reduces the load on the video data distributing device at broadcast time of low audience demand.

When a large number of subscribers is predicted, the server switches to the NVOD service to reduce the load on the system in the video data distributing device during the management of the load of the video server.

Automatically switching to the FVOD service or NVOD service in broadcasting the video requested by a subscriber depending on the load on the video server (or the number of simultaneous audiences) enables the CATV operator to be free from troublesome operations such as organizing programs to be broadcast through the NVOD service, scheduling broadcast times, etc.

Additionally, since the video data distributing device automatically switches the broadcast services for the subscribers to the FVOD service or NVOD service, the subscriber demand, for example, the number of subscribers by title, can be monitored in the NVOD service as well as the FVOD service.

Furthermore, the NVOD service can be further utilized by broadcasting other video data in the NVOD service for other programs before the broadcast of the requested video is actually started, after the service system is switched to the NVOD service.

BRIEF DESCRIPTION OF THE DRAWINGS

FIG. 3 shows the screen (1) displayed when the title of a program is requested and selected by the subscriber in an interactive mode in the conventional FVOD service, and also shows the operations on the screen;

FIG. 5 shows the screen (1) displayed when the title of a program is requested and selected by the subscriber in an interactive mode in the conventional NVOD service, and also shows the operations on the screen;

FIG. 9 shows the principle (2) of the present invention;

FIG. 15 shows the operations of the management/control server of the present invention;

FIG. 17 shows the screen (1) displayed when the title of a program is requested and selected by the subscriber in an interactive mode according to the present invention, and also shows the operations on the screen of the present invention;

FIG. 19 shows the mechanism of putting in a queue a subscriber who has requested the broadcast of a program before the broadcast of the program is started when it is to be broadcast after the NVOD service is selected of the present invention.

DESCRIPTION OF THE PREFERRED EMBODIMENT

Figure 1:
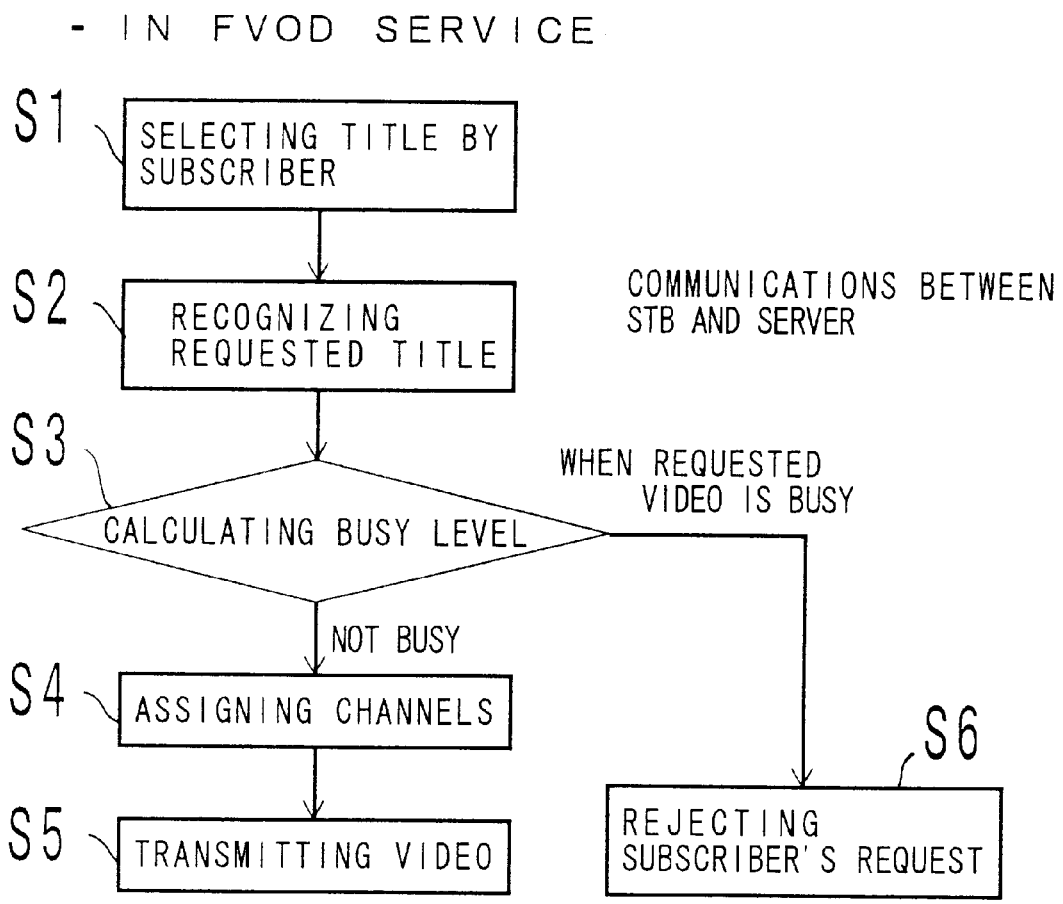
FIG. 1 shows the conventional FVOD service system.
Figure 2:
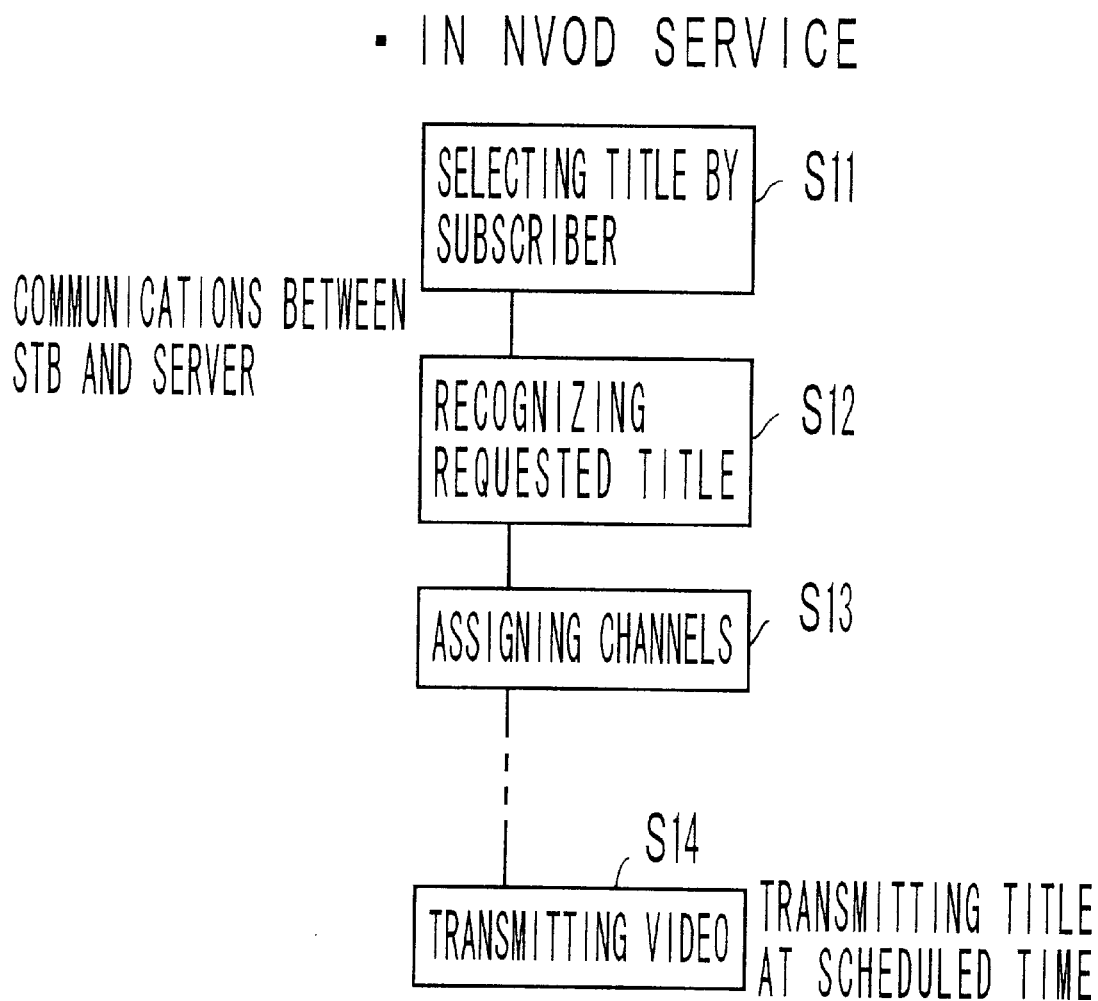
FIG. 2 shows the conventional NVOD service system.
Figure 4:
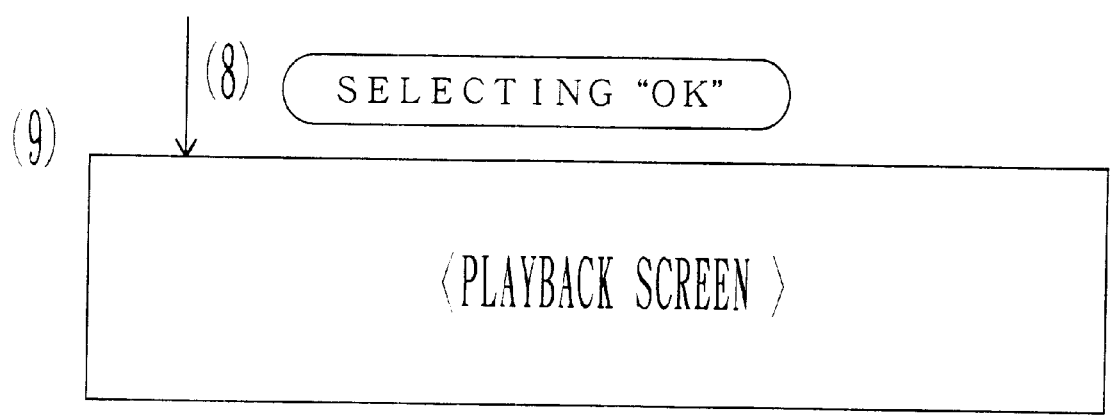
FIG. 4 shows the screen (2) displayed when the title of a program is requested and selected by the subscriber in an interactive mode in the conventional FVOD service, and also shows the operations on the screen.
Figure 6:
FIG. 6 shows the screen (2) displayed when the title of a program is requested and selected by the subscriber in an interactive mode in the conventional NVOD service, and also shows the operations on the screen.
Figure 7:
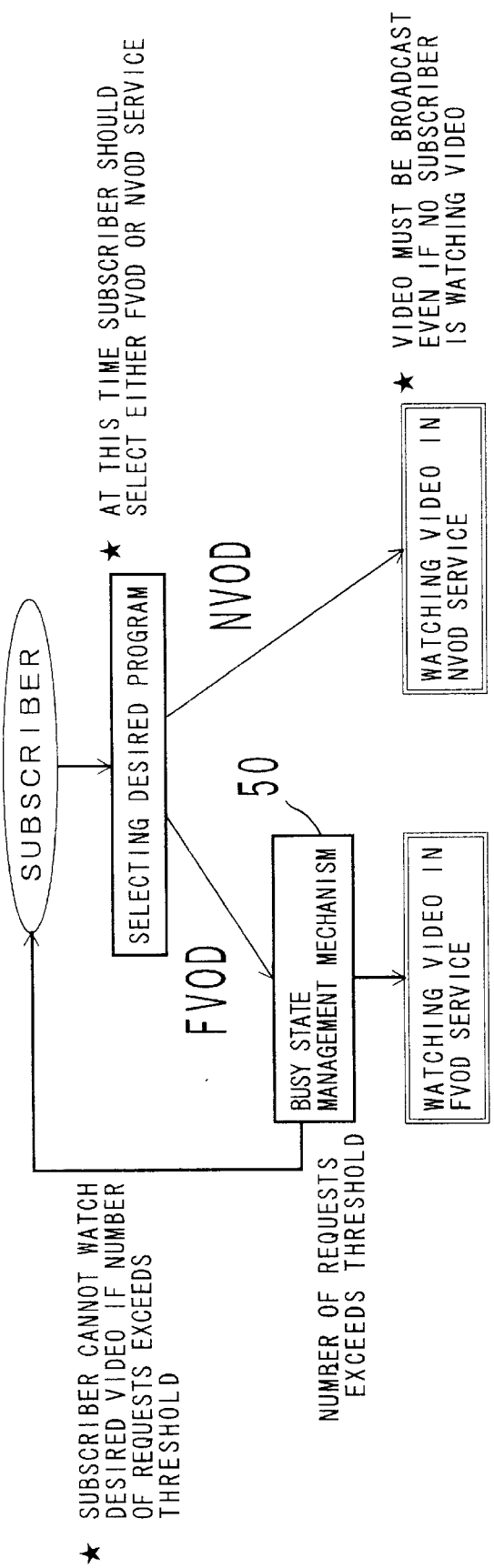
FIG. 7 shows the problems with the conventional video-on-demand system.
Figure 8:
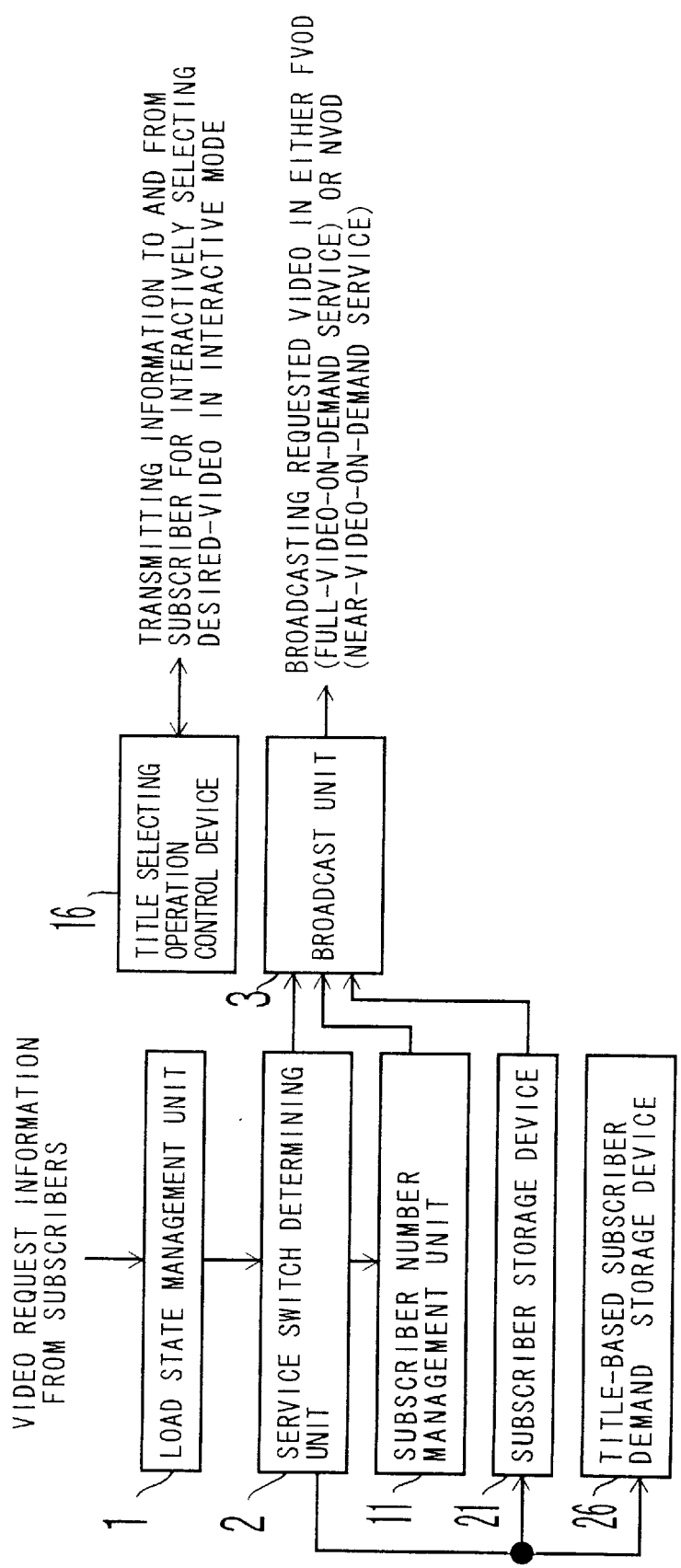
FIG. 8 shows the principle (1) of the present invention.

FIG. 8 shows the principle (1) of the present invention.

The first aspect of the present invention relates to a video data distributing device containing at least one video server having a video data storage device and a streaming unit. The video data storage device stores video data. The streaming unit reads the video data from the video data storage device to perform a video streaming process on the video data. The video data distributing device provides a subscriber with a video-on-demand service at the request from the subscriber. The video data distributing device comprises a load state management unit 1 for managing the load on the process of each video server; a service switch determining unit 2 for determining, upon receipt of a video request from a subscriber, whether the broadcast of the requested video is to be serviced in a full-video-on-demand service or a near-video-on-demand service depending on the management information managed by the load state management unit 1; and a broadcast unit 3 for broadcasting the requested video through the full-video-on-demand service or near-video-on-demand service for the subscriber according to the determination result from the service switch determining unit 2.

The load state management unit 1 manages, for example, the number of videos being processed by each video server (In the FVOD service, this equals the number of the subscribers to whom the video is being distributed by the streaming unit of the video server). When video data is newly requested by a subscriber and broadcast and when the number of the videos managed by the load state management unit 1 exceeds a predetermined threshold, the service switch determining unit 2 switches the type of service from the full-video-on-demand service to the near-video-on-demand service.

The load state management unit 1 also manages the number of the videos (that is equal to the number of the videos being watched by the subscribers in the FVOD service) stored in the video data storage device and being accessed by the streaming unit of each video server. When the video data newly requested by a subscriber is broadcast and when the number of the videos managed by the load state management unit 1 exceeds a predetermined threshold, the service switch determining unit 2 switches the type of service from the full-video-on-demand service to the near-video-on-demand service.

The load state management unit 1 further manages the number of subscribers (number of subscribers simultaneously watching the program) currently watching each program whose video data is stored in the video data storage device of each video server. When the video data newly requested by a subscriber is broadcast and when the number of subscribers managed by the load state management unit 1 exceeds a predetermined threshold, the service switch determining unit 2 switches the type of service from the full-video-on-demand service to the near-video-on-demand service.

That is, according to the first aspect of the present invention, the load state management unit 1 manages the load on the process of each video server. When the service switch determining unit 2 receives a request to watch video from a subscriber, it determines whether the requested video should be broadcast in the full-video-on-demand (hereinafter referred to as "FVOD") service or the near-video-on-demand (hereinafter referred to as "NVOD") service according to the management information managed by the load state management unit 1. According to the determination result, the broadcast unit 3 broadcasts the video requested by the subscriber in the FVOD or NVOD service to the subscriber.

Therefore, the video is requested by a subscriber and broadcast after being dynamically switched to the FVOD or NVOD service based on the load on each video server.

The second aspect of the present invention further comprises, for each video whose data is stored on the video data storage device in each of the above described video servers, a subscriber number management unit 11 for managing the number of subscribers watching broadcast programs in the NVOD service in addition to the load state management unit 1, service switch determining unit 2, and broadcast unit 3 applied to the first aspect of the present invention. When the broadcast unit 3 determines, according to the management information from the audience number management unit 11, that there are no subscribers watching the program being broadcast in the NVOD service, it stops the broadcast of the program.

According to the second aspect of the present invention, the subscriber number management unit 11 manages the number of subscribers watching a program broadcast in the NVOD service relating to the video whose video data is stored in the video data storage device in each video server. When the broadcast unit 3 determines that there are no subscribers watching the program being broadcast in the NVOD service based on the management information from the subscriber number management unit 11, it stops broadcasting the program.

Therefore, the system resources of the video data distributing device such as a video server can be efficiently utilized.

In addition, to the load state management unit 1, service switch determining unit 2, and broadcast unit 3 according to the first aspect, the third aspect of the present invention further comprises a title selecting operation control device 16 for interactively inputting, in the same format in the NVOD service and the FVOD service, a selected title of a video displayed on the monitor of the receiving terminal device mounted in a subscriber's home.

According to the third aspect of the present invention, the title selecting operation control device 16 interactively inputs, in the same format in the NVOD service and the FVOD service, a selected title of a video displayed on the monitor of the receiving terminal device mounted in a subscriber's home.

Therefore, when a subscriber selects a desired video, he or she does not have to determine whether the video is to be broadcast through the FVOD service or NVOD service.

The fourth aspect of the present invention further comprises a subscriber storage device 21 in addition to the load state management unit 1, service switch determining unit 2, and broadcast unit 3. The subscriber storage device 21 stores a list of subscribers requesting a video program when the service is switched by the service switch determining unit 2 to the NVOD service, and when a subscriber requests to watch the video program after the switch and before the actual broadcast of the program. The broadcast unit 3 also provides the NVOD service to the users stored in the subscriber storage device 21.

The subscriber storage device 21 stores, for example, the list of subscribers in the order in which they requested to watch a video program.

According to the fourth aspect of the present invention, the subscriber storage device 21 stores a list of subscribers when a video program is switched by the service switch determining unit 2 to the NVOD service, and when a subscriber requests to watch the video program after the switch and before the actual broadcast of the program. The broadcast unit 3 provides the NVOD service for the subscribers stored in the subscriber storage device 21.

Thus, the requests for the broadcast of video can be prevented from being rejected.

The fifth aspect of the present invention further comprises a title-based subscriber demand storage device 26 in addition to the load state management unit 1, service switch determining unit 2, and broadcast unit 3. The title-based subscriber demand storage device 26 receives service switch information from the service switch determining unit 2, and records the number of subscribers watching the video whose data is stored in the video data storage device separately for the FVOD service and NVOD service.

According to the fifth aspect of the present invention, the title-based subscriber demand storage device 26 receives service switch information from the service switch determining unit 2, and records the number of subscribers watching the video whose data is stored in the video data storage device separately for the FVOD service and NVOD service.

Therefore, the subscriber demand for each video can be obtained for each of the FVOD and NVOD services.

FIG. 9 is a view (2) explaining the principle of the present invention.

The sixth aspect of the present invention relates to a video data distributing device comprising one or more video servers. Each of the video servers comprises a video data storage device for storing video data and a streaming unit for reading the video data from the video data storage device. With this configuration, the video data distributing device provides a video-on-demand service for subscribers.

A load state management device 31 manages the load on each of the video servers.

Upon receipt of a request to watch a video from a subscriber, a first service switch determining device 32 determines, according to the management information managed by the load state management device 31, whether the video is to be broadcast through the FVOD service or NVOD service.

Upon receipt of a request to watch a video from a subscriber, a second service switch determining device 33 determines, based on the request reception time, whether the video is to be broadcast through the FVOD service or NVOD service.

A broadcast device 34 broadcasts the video requested by the subscriber in the FVOD service or NVOD service depending on the determination result from the first service switch determining device 32 and second service switch determining device 33.

That is, according to the sixth aspect of the present invention, the load state management device 31 manages the load on the processing of a video server. Upon receipt of a request to watch a video from a subscriber, the first service switch determining device 32 determines, according to the management information managed by the load state management device 31, whether the video is to be broadcast through the FVOD service or NVOD service.

Upon receipt of a request to watch a video from a subscriber, the second service switch determining device 33 determines, based on the request reception time, whether the video is to be broadcast through the FVOD service or NVOD service.

The broadcast device 34 broadcasts the video requested by the subscriber in the FVOD service or NVOD service depending on the determination result from the first service switch determining device 32 and second service switch determining device 33.

Therefore, the video-on-demand service can dynamically and statically switch the video-on-demand services. At a broadcast time having a large number of subscribers, the load on the system of the video data distributing device can be reduced at that time by adopting the NVOD service by priority.

Figure 10:
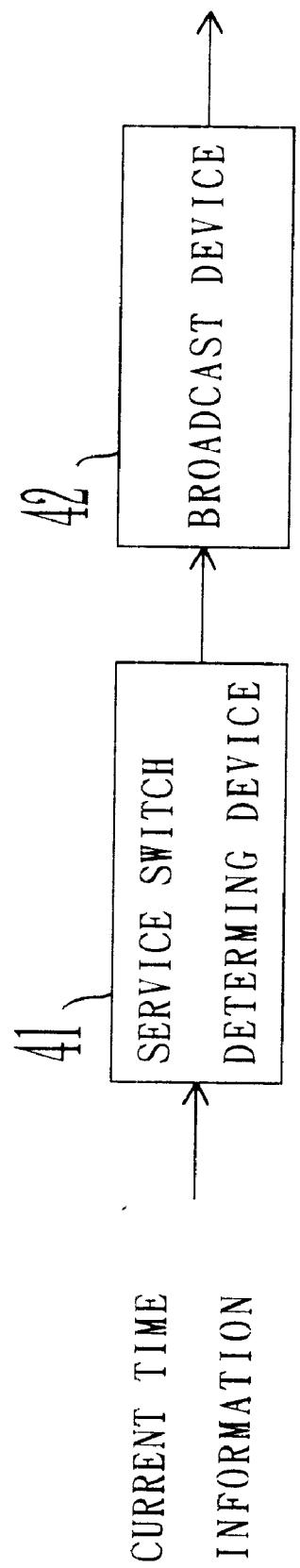
FIG. 10 shows the principle (3) of the present invention.

FIG. 10 is a view (3) showing the principle of the present invention.

The seventh aspect of the present invention relates to a video data distributing device comprising one or more video servers. Each of the video servers comprises a video data storage device for storing video data and a streaming unit for reading the video data from the video data storage device. With this configuration, the video data distributing device provides a video-on-demand service for subscribers.

Upon receipt of a request to watch a video from a subscriber, a service switch determining device 41 determines, based on the reception time, whether the video is to be broadcast through the FVOD service or NVOD service.

The broadcast device 42 broadcasts the video requested by the subscriber in the FVOD service or NVOD service depending on the determination result from the service switch determining device 41.

According to the seventh aspect of the present invention, upon receipt of a request to watch a video from a subscriber, the service switch determining device 41 determines, based on the reception time, whether the video is to be broadcast through the FVOD service or NVOD service. The broadcast device 42 broadcasts the video requested by the subscriber in the FVOD service or NVOD service depending on the determination result from the service switch determining device 41.

Therefore, the effect obtained in the above described sixth aspect of the present invention can be obtained.

In the above described first, sixth, and seventh aspects of the present invention, instructive and interesting information can be provided to the subscribers by the service information broadcast devices, providing various service information to the subscribers until the requested video is broadcast. The service information is broadcast after the service switch determining units 2, 32, and 33 switch the video broadcast services for the subscribers from the FVOD service to the NVOD service, until the broadcast starts in the NVOD service.

The embodiment of the present invention is described by referring to the attached drawings.

Figure 11:
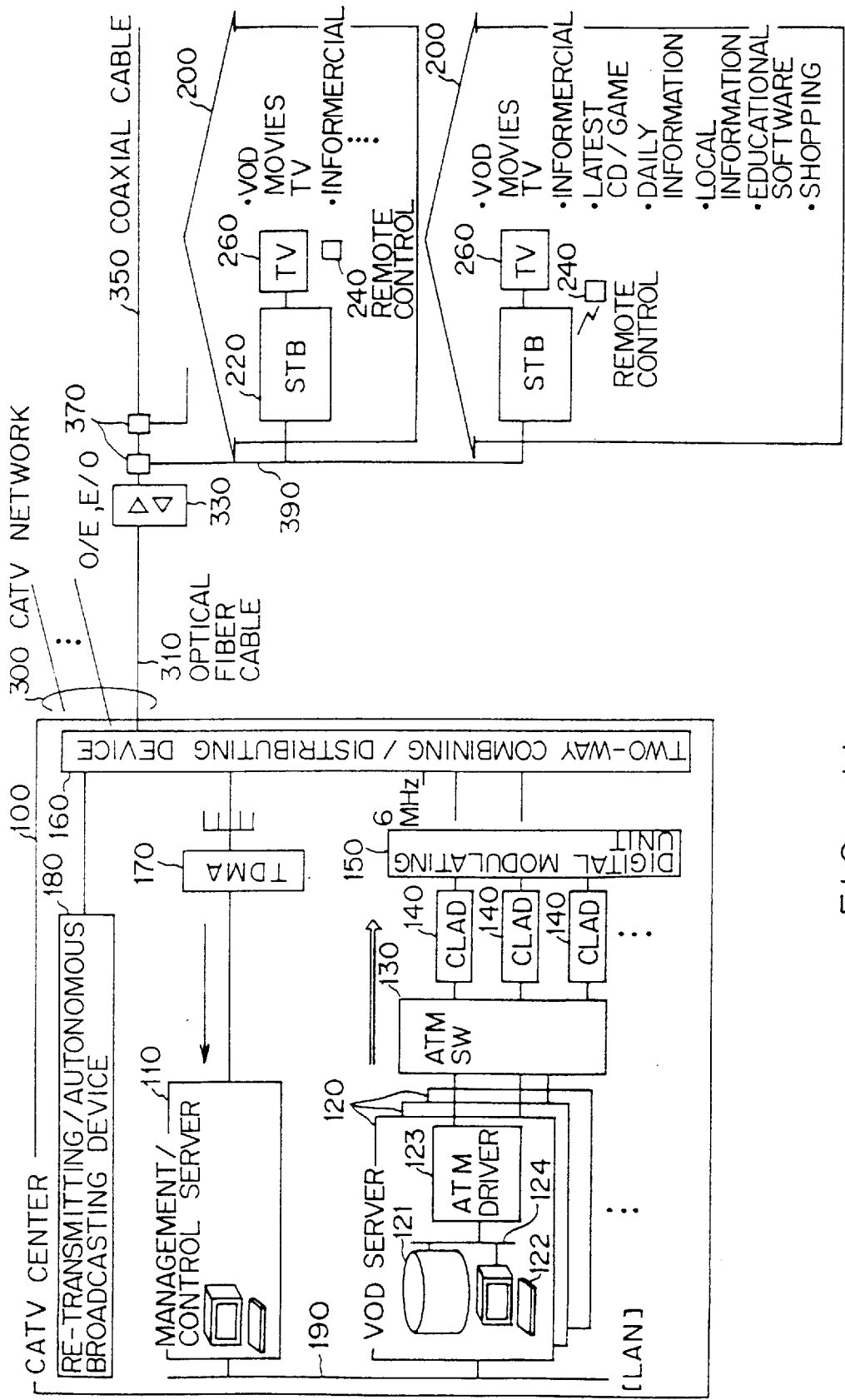
FIG. 11 shows the configuration of a CATV system for providing the video-on-demand service as an embodiment of the present invention.

FIG. 11 shows the configuration of the outline of a CATV system that provides a VOD service as an embodiment of the present invention.

A CATV center 100 provides a VOD service to a plurality of subscriber homes 200 and is connected to the plurality of subscriber homes 200 through a CATV network 300.

The CATV network 300 is an HFC (hybrid fiber coax) network, and comprises a plurality of optical fiber cables 310 connected to the CATV center 100; a plurality of optical fiber nodes 330 provided for each optical fiber cable 310; a first coaxial cable 350 connected to the optical fiber node 330; and a second coaxial cable 390 connected from the first coaxial cable 350 to an STB (set top box) 220 in the subscriber home 200, along the tree branches through a tap 370. The optical fiber node 330 comprises an O/E (opto/electrical converter) and an E/O (electro/optical converter), and transmits a down signal, that is, an optical signal transmitted through the optical fiber node 330 to the first coaxial cable 350 after converting it into an electrical signal by the O/E. The electrical signal is transmitted to the second coaxial cable 390 through the tap 370. The optical fiber node 330 also transmits an up signal, that is, an electrical signal transmitted from the STB 220 in the subscriber home 200 transmitted through the first coaxial cable 350 to the optical fiber node 330 after converting it into an optical signal through the E/O.

Each subscriber home 200 comprises the STB 220 that is a home communications terminal unit for use in the VOD service provided by the CATV center 100; a remote controller 240 for operating the STB 220; and a TV receiver 260 for displaying the video data received by the STB 220.

Figure 12:
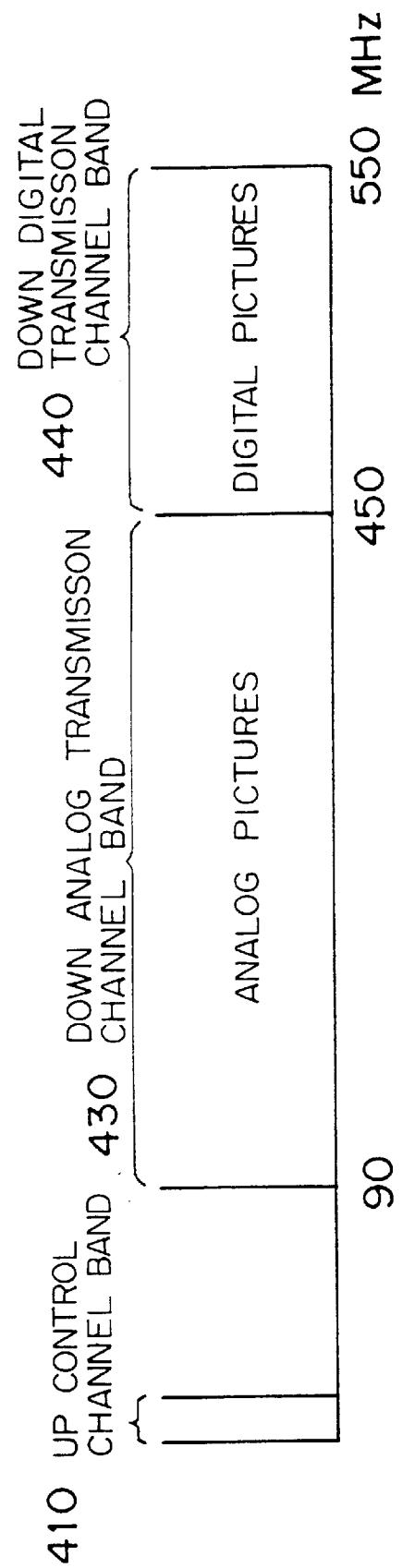
FIG. 12 shows an example of a frequency band used to realize the video-on-demand service in the above described embodiment of the present invention.

The CATV center 100 and STB 220 at each subscriber home 200 perform two-way communications through the CATV network 300. In this case, as shown in FIG. 12, the two-way communications are established along an up control channel 410; a down control channel (not shown in the drawings); a down analog transmission channel 430; a down digital transmission channel 440, etc. Each channel is assigned a frequency band as shown in FIG. 12. Through the two-way communications, the CATV center 100 provides services such as the VOD (video-on-demand) service to each subscriber home 200.

The down analog transmission channel 430 is a channel along which analog video signals for CATV broadcast, such as common TV broadcasts, satellite communications broadcasts, autonomous broadcast programs, etc. are transmitted. The down digital transmission channel 440 is a channel along which digital video data provided in the video-on-demand service is transmitted.

If the band of 450 MHz through 550 MHz is reserved as shown in FIG. 12 as the down digital transmission channel 440, the digital video data for the video-on-demand service can be transmitted from the CATV center 100 to each subscriber home 200 along a plurality of channels using the frequency band of 100 MHz. For example, if digital modulation is performed using a 64-value QAM, then the digital video data can be transmitted at 24 Mbps along a single digital transmission channel of 6-MHz bandwidth. Therefore, if the digital video data is efficiently encoded at an encoding speed of 6 Mbps, then four video transmission channels for transmitting digital video data can be reserved along a digital transmission channel with the bandwidth of 6 MHz. This means that 60 video distribution channels are reserved to transmit digital video data if 15 digital transmission channels of 6 MHz bandwidth each are assigned in the range of 450 MHz through 550 MHz. That is, the 60 subscriber homes 200 accommodated by one optical fiber node 330 can be simultaneously provided with FVOD services.

The CATV center 100 comprises a management/control server 110; a plurality of VOD servers 120; an ATM switch (ATM SW) 130; a plurality of CLADs (cell assembly and disassembly) 140 provided for each output port of the ATM switch 130; a digital modulating unit 150; a combining/distributing device 160; a TDMA (time division multiple access) device 170; and a retransmitting/autonomous broadcasting device 180.

The management/control server 110 is connected to a plurality of VOD servers 120 through a LAN 190.

The management/control server 110 manages the titles of videos stored by the plurality of VOD servers 120. It analyzes a subscriber's request input from the TDMA 170, recognizes the title of the requested video data, and makes the VOD server 120 perform a video streaming process. It also monitors the busy condition of each VOD server 120 and controls the switch between the FVOD and NVOD services according to the busy condition. The management/control server 110 comprises a server multiplexing level management table 110a shown in FIG. 13A to manage the busy condition of each VOD server 120. The server multiplexing level management table 110a stores the number of video data being processed simultaneously in the server and a threshold value based on the upper limit value for the video data simultaneously processed by each VOD server 120.

The management/control server 110 comprises a disk (disk device) multiplexing level management table 110b shown in FIG. 13B. The disk multiplexing level management table 110b stores the number of video programs being accessed by the VOD server 120 for each of the disk devices of a video data storage device 121, and also stores a threshold value based on the upper limit value for the number of video programs to be simultaneously read from each disk device.

The management/control server 110 comprises a title access multiplexing level management table 110c shown in FIG. 13C. The title access multiplexing level management table 110c stores the number of subscribers currently watching the program for each title of the videos stored on the disk devices, and also stores a threshold value based on the number of videos accessed simultaneously.

Thus, the management/control server 110 comprises all of the server multiplexing level management table 110a, disk multiplexing level management table 110b, and title access multiplexing level management table 110c, required to monitor the busy condition of each element of the VOD server 120.

Each VOD server 120 generates a video stream to be provided to a subscriber at each subscriber home 200. It comprises the video data storage device 121 storing video data; a computer 122 for reading video data from the video data storage device 121 and generating a video stream; and an ATM driver 123 for assembling a plurality of ATM cells of 53-byte length from the video stream output from the computer 122, and outputting the ATM cells to the input port of the ATM switch 130. At the instruction from the management/control server 110, the above described video streaming process is performed.

The video data storage device 121 comprises, for example, a disk array, and stores the video data after distributing them to a plurality of hard disk devices in a striping method. It may also comprise other data storage devices such as an optical disk device, etc. than the hard disk device.

The video data storage device 121 stores video data as being encoded according to an efficient encoding technology such as MPEG1 or MPEG2.

The computer 122, video data storage device 121, and ATM driver 123 are connected to each other through the bus 124.

The ATM switch 130 is connected to each of the VOD servers 120 through an input port with a transmission speed of, for example, 156 Mbits/sec. The output port is connected to each of the CLADs 140. The ATM switch 130 switches the video stream output from the VOD server 120 for transmission to the digital transmission channel.

The CLADs 140 are provided for the number of transmission channels in the digital transmission channel band 440 shown in FIG. 12. That is, assuming that the bandwidth of one transmission channel is 6 MHz, 15 transmission channels are provided in the digital transmission channel band 440. Therefore, 15 CLADs are provided in this example.

The CLAD 140 disassembles an ATM cell input from the output port of the ATM switch 130, multiplexes the video data obtained by removing the header information from the disassembled cell, and outputs the video data of 24 Mbps to the digital modulating unit 150.

The digital modulating unit 150 comprises a digital modulator corresponding to each of the CLADs 140 for digitally modulating the video data input from the CLADs 140 in a modulation system such as QAM (quadrature amplitude modulation), VSB (vestigial sideband), etc. and outputting the data to the combining/distributing device 160. The digital modulator comprises, for example, a 64-value QAM modulator. The QAM modulator modulates the video data of, for example, 24 Mbps input from the CLAD 140 through the 64-value QAM, and outputs the data to the combining/distributing device 160 along one channel with the bandwidth of 6 MHz. In this case, if the video data is encoded according to MPEG2 at the encoding speed of 6 Mbps, then four video distribution channels can be reserved with each channel distributing respective programs to four subscriber homes 200.

The combining/distributing device 160 comprises a combining unit, a distributor, an opto-electrical converting device, ect. The combining unit combines analog signals such as terrestrial and satellite waves of the down analog transmission channel band 430 shown in FIG. 12 and input from the re-transmitting/autonomous broadcasting device 180; digital video data for a plurality of video distributing channels input from the digital modulating unit 150 of the down digital transmission channel band 440 shown in FIG. 12; and a down control signal to be transmitted to each subscriber home 200 after being input from the TDMA 170. Then, the combining unit converts the electrical signals into optical signals. The distributor distributes an optical signal obtained as a result of the combination to each optical fiber cable 310 by the combining unit and assigned a frequency as shown in FIG. 12. The opto-electrical converting device converts an up control signal from a plurality of subscriber homes 200 input from the optical fiber cable 310 into the electrical signal, and outputs the signal to the TDMA 170.

The TDMA 170 time-divisionally multiplexes the up control signal from a plurality of subscriber homes 200 input from the combining/distributing device 160, and outputs the signal to the management/control server 110. The TDMA 170 time-divisionally multiplexes the down control signal addressed to the STB 220 of each of the subscriber homes 200 input from the management/control server 110, and outputs them to the combining/distributing device 160.

The re-transmitting/autonomous broadcasting device 180 outputs an analog picture signal for terrestrial and satellite broadcasts received through a receiving antenna (not shown in the attached drawings,) and an analog video signal for an autonomous broadcast to the combining/distributing device 160.

The STB 220 provided in the subscriber home 200 transmits a signal (request signal) through the control channel of the up control channel band 410 indicating the title of a desired video to the CATV center 100. The CATV center 100 receives the request signal at the combining/distributing device 160 through the CATV network 300. The combining/distributing device 160 converts the request signal into an electrical signal and outputs it to the management/control server 110 thorough the TDMA 170.

If the video requested using the request signal can be distributed, then a channel for distributing the requested video is assigned. The channel information is provided through the down control channel to the STB 220 of the requesting subscriber home 200 as the destination. The STB 220 sets the receiving channel to the channel specified according to the channel information. Then, the management/control server 110 instructs the VOD server 120 to perform a streaming process on the data of the requested video to output the video data of the requested title to the ATM switch 130 through the above described receiving channel.

The VOD server 120 reads the video data requested by the subscriber from the built-in video data storage device 121, and outputs the data to the input port of the ATM switch 130 after assembling of the ATM cells by the ATM driver 123.

The ATM switch 130 receives the ATM cells and outputs the cells to the CLAD 140 corresponding to the receiving channel.

The CLAD 140 demultiplexes and multiplexes the input ATM cells and generates video data having a predetermined transmission rate, and outputs the data to the corresponding digital modulating device in the digital modulating unit 150. The digital modulating device modulates the data in such a way that the input video data can be transmitted along the receiving channel. Then, the device outputs the modulated video data to the combining/distributing device 160. After converting the input digital video data into an optical signal, the combining/distributing device 160 transmits the signal to the optical fiber cable 310 connected to the optical fiber node 330 in which the second coaxial cable 390 for the subscriber home 200 is accommodated.

The STB 220 at the subscriber home 200 receives at the built-in tuner the video data distributed from the CATV center 100 through the first coaxial cable 350. After demodulating the received video data by a digital demodulating device, a VCI extracting unit retrieves only the requested video data from the demodulated video data, decodes the encoded video data, and outputs the decoded data to the TV receiver 260. The TV receiver 260 reproduces the pictures and sounds of the subscriber-requested video.

Figure 14:
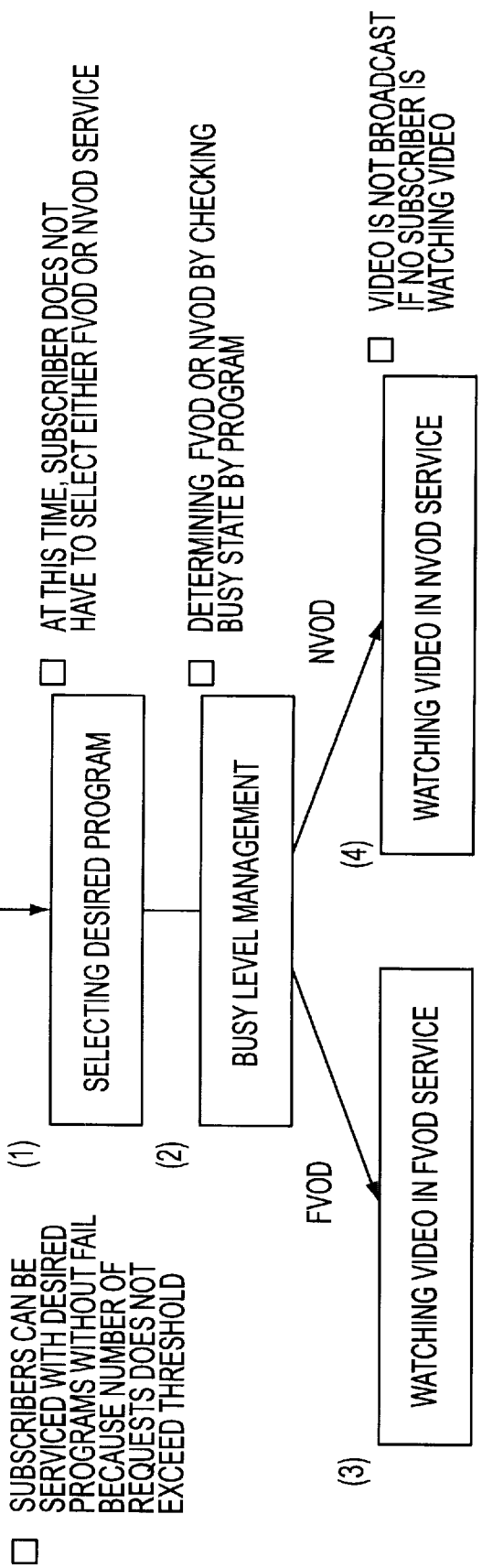
FIG. 14 shows an outline of the capabilities of the present embodiment of the present invention.

FIG. 14 explains the basic operations of the video-on-demand service according to the present embodiment.

When a desired video is selected on the screen of the TV receiver 260, the subscriber does not have to select the FVOD service or NVOD service. That is, the subscriber only has to select the title of the desired video through a remote control device 240 ((1) in FIG. 14).

Upon receipt of a video request signal sent from the STB 220 of a subscriber, the CATV center 100 determines the busy state of the requested video through the busy management mechanism in the management/control server 110, and determines whether the video is to be serviced in the FVOD service or NVOD service. In this example, it is serviced in the FVOD service by priority. If it cannot be serviced in the FVOD service, the CATV center 100 transmits to the subscriber a notification that the requested program is to be broadcast in the NVOD service after a predetermined time (for example, after 30 minutes). Then, the requested program is broadcast in the NVOD service after the predetermined time ((2) in FIG. 14).

As a result, the subscriber can be watching the desired program in either the FVOD service or NVOD service ((3) and (4) in FIG. 14).

Conventionally, if a program is requested to be broadcast in the FVOD service, the request is rejected when the program is in the busy state. According to the present embodiment, the requested program can be serviced in the NVOD service. Therefore, when there are only a few video distribution channels available, the FVOD service is switched to the NVOD service, and the requested video is broadcast in the NVOD service along an available channel.

The present embodiment stops broadcasting in the NVOD service when no subscribers are watching the program. Furthermore, the busy management mechanism on the management/control server 110 constantly monitors the number of the subscribers (simultaneous subscribers), and dynamically changes the service format as required. For example, a requested program is serviced in the FVOD service with a decreasing number of simultaneous subscribers, whereas it is serviced in the NVOD service with an increasing number of simultaneous subscribers. If a busy level exceeds a threshold value after a certain request for a video is received, and if another request for the same video is received before the video is broadcast in the NVOD service switched from the FVOD service, then these requests are serviced in the NVOD service.

The operations of the present embodiment are explained in detail by referring to FIG. 15.

FIG. 15 shows the control process of the VOD service performed by the management/control server 110.

As shown in FIG. 15, the management/control server 110 comprises a requested title recognizing mechanism 111; a VOD service state monitoring mechanism 112; a busy state monitoring mechanism (busy management mechanism) 113; an FVOD service providing mechanism 114; an NVOD service providing mechanism 115; and a state monitoring mechanism 116.

The CATV center 100 receives a request signal indicating a request to watch a video from the STB 220 at the subscriber home 200 along the up control channel 410. The request signal (broadcast request signal) is input to the management/control server 110 through the combining/distributing device 160 and TDMA 170.

Upon receipt of the broadcast request signal, the requested title recognizing mechanism 111 recognizes the title of the video requested by the subscriber and notifies the VOD service state monitoring mechanism 112 of the recognized title.

If the title of the video is recognized and the video is to be broadcast in the NVOD service after a predetermined time, then it instructs the NVOD service providing mechanism 115 to broadcast the video for the subscribers in the NVOD service. Thus, the NVOD service providing mechanism 115 controls the VOD server 120 to broadcast the requested video for the subscribers in the NVOD service. At this time, the VOD service state monitoring mechanism 112, for example, puts the subscribers in a queue and then starts broadcasting the video in the NVOD service, removes the subscribers from the queue, and broadcasts the requested video to the subscribers in the NVOD service.

The VOD service state monitoring mechanism 112 notifies the busy state monitoring mechanism 113 of the title, unless the title of the video requested by the subscriber refers to the video to be serviced in the NVOD service.

When receiving the notification from the VOD service state monitoring mechanism 112, the busy state monitoring mechanism 113 requests the VOD server 120 for performing the streaming process on the video for the number of the subscriber-requested broadcast videos (simultaneous broadcasts) being broadcast and its threshold value. The busy state monitoring mechanism 113 then compares the number of broadcast videos with the threshold value, and determines that the requested video is in the busy state if the number of the simultaneous broadcasts is equal to or larger than the threshold value n. Then, the busy state monitoring mechanism 113 determines that the request from the subscriber is accepted by broadcasting the video in the NVOD service. On the other hand, if the number of the simultaneous broadcasts is smaller than the threshold value n, the busy state monitoring mechanism 113 determines that the requested video is not in the busy state and the request should be accepted by broadcasting the video in the FVOD service (first method).

It also can be determined whether a video can be serviced for a subscriber in either the FVOD service or NVOD service, by checking the busy state of the VOD server 120 for performing the streaming process on the video of the title requested by the subscriber, the busy state of the disk device storing the video data of the video having the title, and the current busy state of the video having the title, etc. (second method). In this method, if each of the busy states does not exceed a predetermined busy level, then it is determined that the video should be serviced in the FVOD service, and the FVOD service providing mechanism 114 is instructed to service the subscriber with the video in the FVOD service. At this time, all of the server multiplexing level management table 110a, disk multiplexing level management table 110b, and title access multiplexing level management table 110c shown in FIGS. 13 A B and C are referred to. The second method is explained in detail later.

When it is determined that the video should be serviced in the FVOD service, the busy state monitoring mechanism 113 instructs the FVOD service providing mechanism 114 to provide the video to the subscriber in the FVOD service. At this time, it notifies the FVOD service providing mechanism 114 of the VOD server 120 which is available to provide the FVOD service.

The FVOD service providing mechanism 114 instructs the VOD server 120 to read the video data requested by the subscriber, and notifies the VOD server 120 of the receiving channel for the video data using a down control channel, to perform the FVOD service for the subscriber. After starting the broadcast of the video, the subscriber operates the remote control device 240 to control the VOD server 120 to accept a request to play, fast-forward, rewind, stop, pause, fast-forwarding-play, or rewinding play the video transmitted through the STB 220 along the up control channel 410. Thus, the FVOD service providing mechanism 114 answers the subscriber's request.

When it is determined that the video is to be serviced in the NVOD service, the busy state monitoring mechanism 113 instructs the NVOD service providing mechanism 115 to provide the video to the subscriber in the NVOD service. At this time, the busy state monitoring mechanism 113 notifies the NVOD service providing mechanism 115 of the VOD server 120 which is available to provide the NVOD service.

Thus, the NVOD service providing mechanism 115 notifies the STB 220 at the subscriber home 200 of the subscriber along the down control channel, of the NVOD service starting time and that the service is switched into the NVOD service. It also notifies the STB 220 of the receiving channel for the video data. The NVOD service providing mechanism 115 provides other video data to the subscriber until the start of the NVOD service. The provided video data can be information about the latest programs, community information, and variations of other data.

Figure 13:
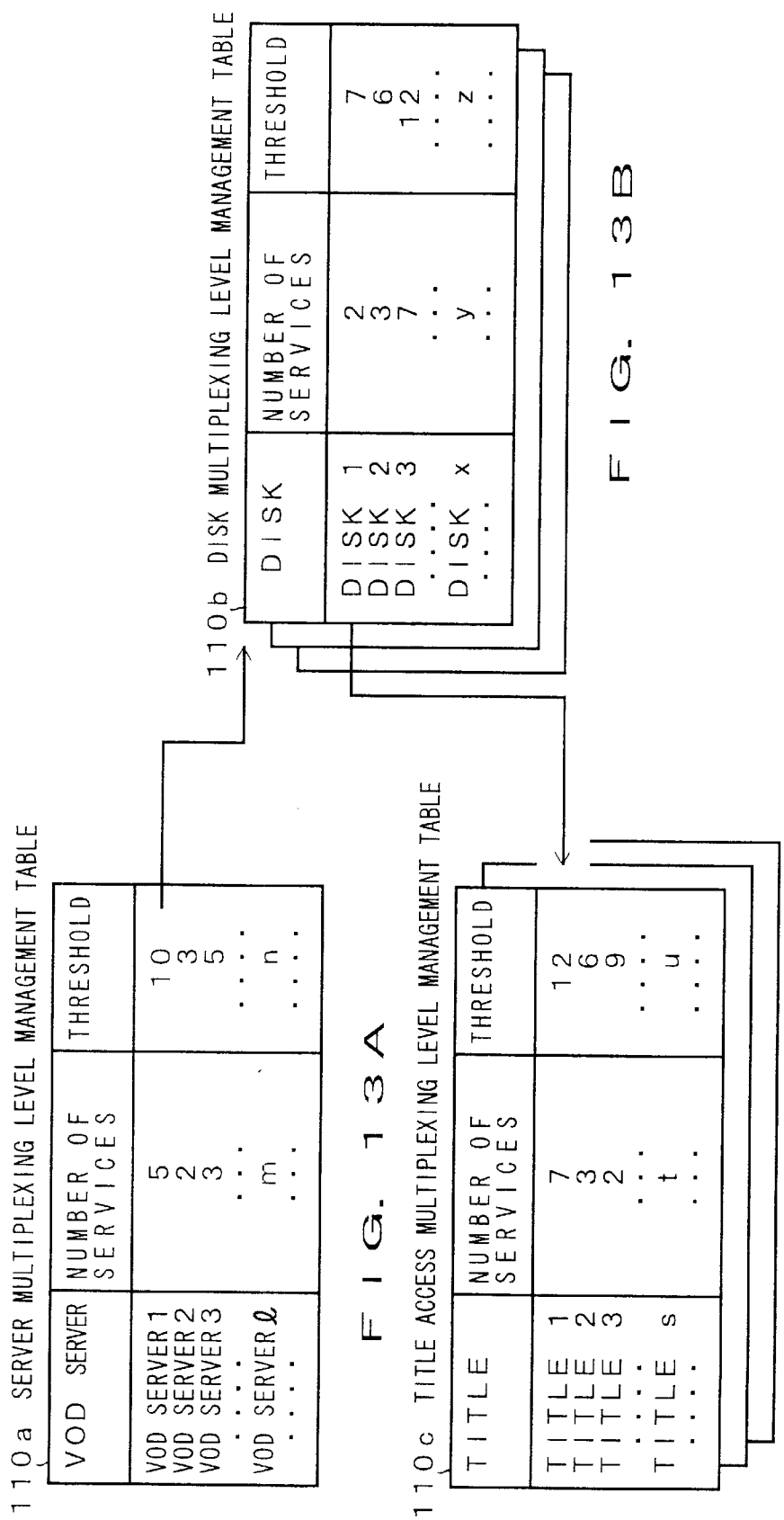
FIG. 13 shows the contents of 3 types of tables used by the management/control server to manage the load on the VOD server of the present invention.

When the FVOD service providing mechanism 114 and NVOD service providing mechanism 115 start broadcasting the requested video to the subscriber, the busy state monitoring mechanism 113 instructs the state monitoring mechanism 116 to increase by 1 the number of services being provided in the corresponding lines of the tables 110a, 110b, and 110c shown in FIG. 13.

When the state monitoring mechanism 116 recognizes the end of the broadcast of the video requested by the subscriber, it decreases by 1 the number of services being provided in the corresponding lines of the tables 110a, 110b, and 110c shown in FIG. 13.

The completion of the broadcast in the FVOD service is recognized at a request to stop the service transmitted from the STB 220 of the subscriber. In the NVOD service, it is recognized by detecting the completion of the broadcast of the video.

Figure 16:
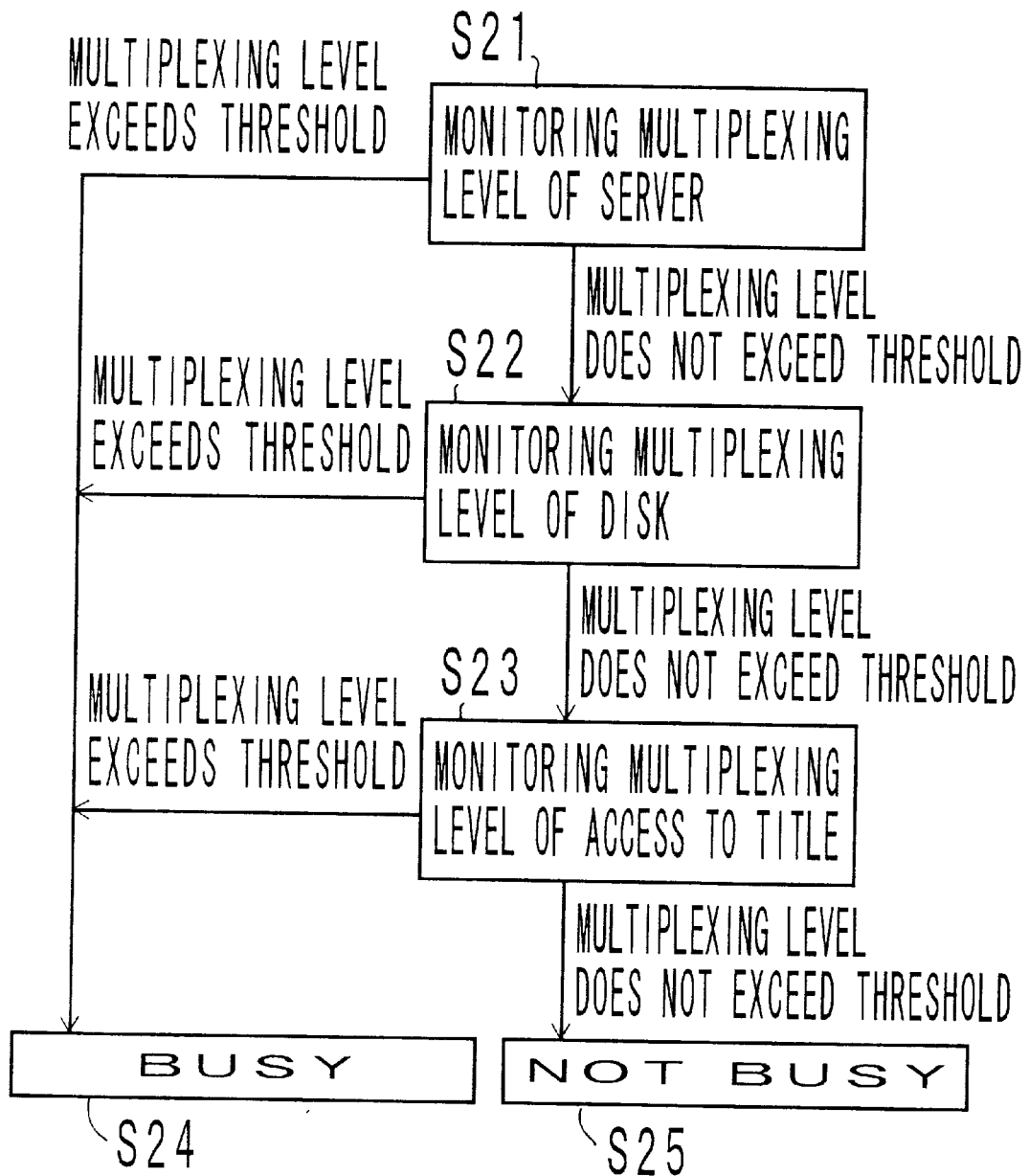
FIG. 16 shows the detailed operations of the busy monitoring mechanism in the management/control server of the present invention.

FIG. 16 shows the detailed operations of the second method by which the busy state monitoring mechanism 113 monitors the busy state.

First, the busy state monitoring mechanism 113 determines the busy level of the VOD server 120 for performing the streaming process on the video having the title requested by the subscriber (S21).

The busy state monitoring mechanism 113 determines the busy level by referring to the server multiplexing level management table 110a shown in FIG. 13A and managed by the busy state monitoring mechanism 113. That is, if the number of the videos (number of services being provided) is equal to or larger than its threshold value n, then the VOD server 120 determines that the busy level (multiplexing level) of the VOD server 120 has exceeded, for example, 80% of the video transmission capability, and that the VOD server 120 is in the busy state (S24).

On the other hand, if the number of the videos (number of services being provided) is smaller than its threshold value n, then the VOD server 120 determines that it is not in the busy state (the multiplexing level has not exceeded 80% of the video transmission capability), and then determines the busy level (multiplexing level) of the disk device, which stores the video data of the video having the title requested by the subscriber, in the video data storage device 121 connected to the VOD server 120 (S22).

The determination is made by referring to the disk multiplexing level management table 110b shown in FIG. 13B managed by the busy state monitoring mechanism 113. That is, if the number of the videos (number of services being provided) being read from the disk device is equal to or larger than its threshold value n, then it is determined that the busy level (multiplexing level) has exceeded, for example, 80% of the data transmission capability, and that the disk is in the busy state (S24).

On the other hand, if the number of the videos (number of services being provided) being read from the disk device is smaller than its threshold value n, then it is determined that the busy level (multiplexing level) has not exceeded, for example, 80% of the data transmission capability, and that the disk is not in the busy state. Then, the multiplexing level of the access to the title is determined (S23).

The determination is made by referring to the title access multiplexing level management table 110c shown in FIG.

13C managed by the busy state monitoring mechanism 113. That is, if the number of the subscribers watching the video is equal to or larger than its threshold value n, then it is determined that the number of simultaneous accesses to the video requested by the subscriber has exceeded, for example, 80% of the processing capability of the VOD server 120 in the FVOD service, and that the access to the video indicates a busy state (S24).

On the other hand, if the number of the subscribers watching the video (the number of videos being broadcast or the number of simultaneous subscribers) is smaller than its threshold value n, then it is determined that the number of simultaneous accesses to the video requested by the subscriber has not exceeded, for example, 80% of the processing capability of the VOD server 120 in the FVOD service, and that the access to the video does not indicate a busy state (S24), and finally that the VOD server 120 is not in the busy state (S25).

If it is finally determined that the VOD server 120 is not in the busy state, then the NVOD service is not provided and the video is not broadcast unless accessed by a subscriber. That is, the CATV center 100 does not broadcast a video unless requested by a subscriber in the NVOD service.

Therefore, the VOD server 120 can reduce the access load on the disk device for storing the video data of the video not requested by subscribers. This enables the video data, whose data is stored on the disk device, to be read at a high speed, and improves the response to a subscriber's request for the video.

Figure 18:
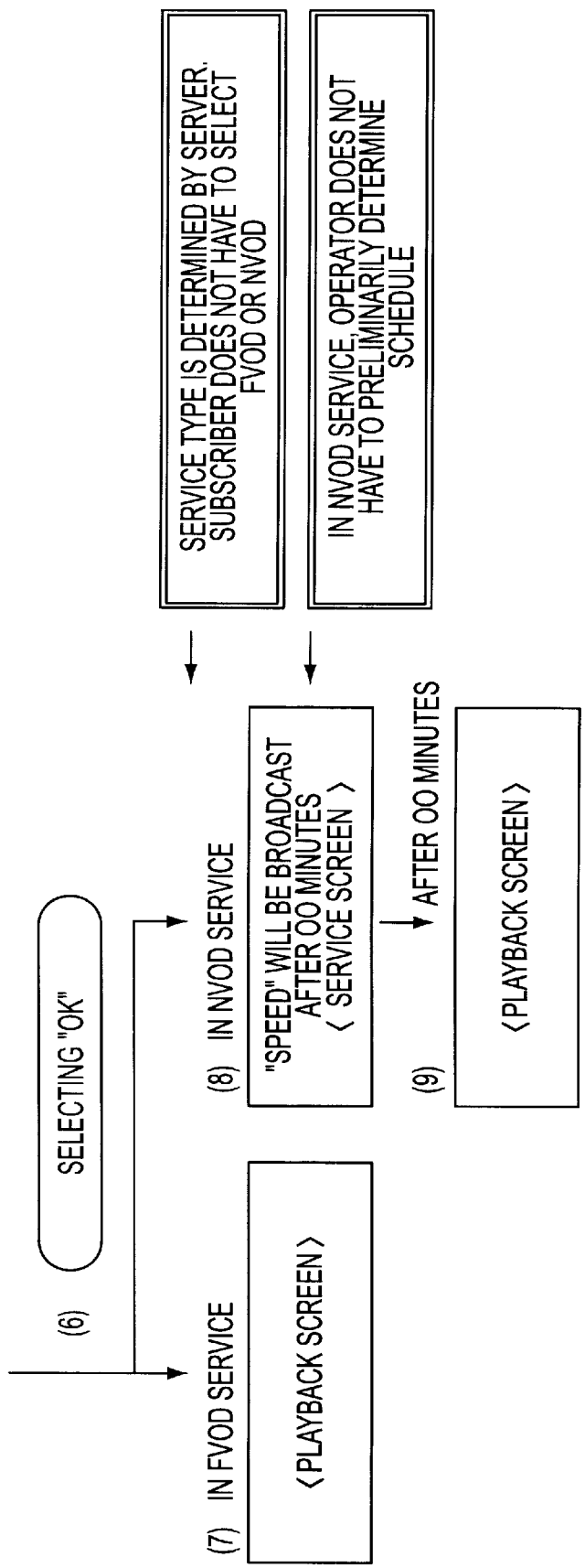
FIG. 18 shows the screen (2) displayed when the title of a program is requested and selected by the subscriber in an interactive mode according to the present invention, and also shows the operations on the screen of the present invention.

The environment of the operations for the VOD service to be provided to subscribers according to the present embodiment is explained by referring to FIGS. 17 and 18.

When a subscriber selects the VOD service through the STB 220, the category selection screen is displayed on the monitor of the TV receiver 260. Since the selection screen for either the FVOD service or NVOD service is not displayed, but the category selection screen is displayed, the subscriber immediately starts the operation by selecting the category of the video.

Through the remote control device 240, the subscriber can select the category of the desired video from each of the categories "latest movies", "weekly best 10", "animation", "foreign movies", "domestic movies", and "others" shown by (1) in FIG. 17.

As shown by (3) in FIG. 17, the titles of the latest movies are listed in the alphabetical order when the "latest movies" is selected as shown by (2) in FIG. 17. The subscriber selects the title of the desired movie by, for example, scrolling the screen using the remote control device 240.

When "speed" is selected as shown by (4) in FIG. 17, the "preview screen" displaying the two buttons "CANCEL" and "OK" as shown by (4) in FIG. 17 is displayed.

In this case, if the subscriber requests "speed", he or she selects the button "OK" using the remote control device 240 as shown by (6) in FIG. 18.

Then, according to the VOD service provided by the CATV center 100, the screen of either the FVOD service shown by (7) in FIG. 18 or the NVOD service shown by (8) in FIG. 18 is displayed on the screen of the TV receiver 260 of the subscriber.

It is determined by the CATV center 100 whether the VOD service is provided in the FVOD service or NVOD service. Therefore, the subscriber does not have to select the type of service. In this example, the CATV center 100 provides the FVOD service by priority as long as the process capabilities permit it. Therefore, there is a high possibility that the subscriber receives the FVOD service, thereby improving the convenience for the subscriber.

In the FVOD service shown by (7) in FIG. 18, "speed" is immediately played back. In the NVOD service, the message "speed will be broadcast after 00 minutes" and the "service screen" to introduce latest movies, community information, etc. are displayed. Then, after 00 minutes, the monitor of the TV receiver 260 displays the playback of "speed" as shown by (9) in FIG. 18.

Thus, in the NVOD service, the operator of the CATV center 100 broadcasts a video having the title requested by the subscriber. Therefore, the operator is free from the conventional problem of preliminarily fixing complicated schedules indicating how the video is to be broadcast at which broadcast time.

FIG. 19 shows the internal mechanism of the NVOD service providing mechanism 115 for realizing the above described function of putting the subscribers in a queue. As shown in FIG. 19A, the NVOD service providing mechanism 115 comprises a subscriber queue service unit 115a for performing the above described queue process for the subscribers, in addition to an NVOD service providing unit 115b for providing the NVOD service.

Assuming that a busy state has occurred when the busy state monitoring mechanism 113 receives the title of the video requested by subscriber Z from the requested title recognizing mechanism 111, the busy state monitoring mechanism 113 instructs the NVOD service providing unit 115b to broadcast the video having the received title in the NVOD service. The VOD service state monitoring mechanism 112 is informed of the switch of the services.

It takes a certain time for the NVOD service providing mechanism 115 to start the broadcast through the VOD server 120. If further requests to broadcast the video are received from subscribers A, B, C, . . . as shown in FIG. 19B before the time of the start of the broadcast, the requests are given from the VOD service state monitoring mechanism 112 to the NVOD service providing mechanism 115. The subscriber queue service unit 115a of the NVOD service providing mechanism 115 puts all the subscribers A, B, C, . . . in a queue 1151 for the video.

When the broadcast in the NVOD service is ready, the NVOD service providing mechanism 115 sequentially retrieves the subscribers in the queue for the video and broadcasts the requested video in the NVOD service to the subscribers.

Thus, when the FVOD service is switched to the NVOD service, a request from a subscriber is not rejected and the requested video is broadcast in the NVOD service after a predetermined time to the subscriber, even if other subscribers issue requests to receive the same video before the actual broadcast time of the video to the subscriber.

Figure 20:
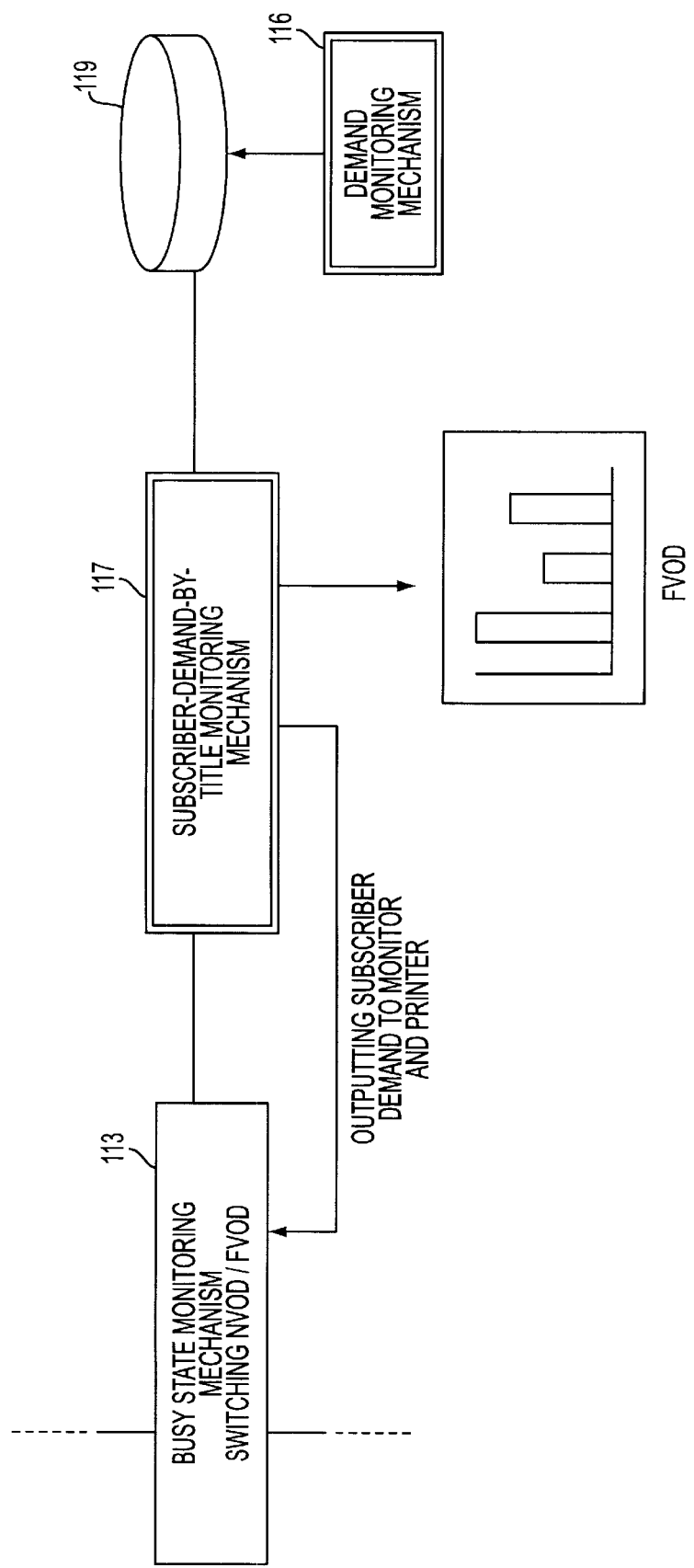
FIG. 20 shows the mechanism of monitoring/obtaining the audience demand by title of the present invention.

FIG. 20 shows the subscriber-demand-by-title monitoring/fetching function of the management/control server 110.

The management/control server 110 comprises a subscriber-demand-by-title monitoring mechanism 117 for realizing the above described function. The subscriber-demand-by-title monitoring mechanism 117 receives switch information about the FVOD service or NVOD service from the busy state monitoring mechanism 113. At this time, it also receives the title information about the video requested by the subscriber. According to these pieces of information, the subscriber demand information such as the latest audience demand by title, etc. is recorded in the storage device 119 such as a disk, etc. separately for the FVOD service and NVOD service. The subscriber-demand-by-title monitoring mechanism 117 reads from the storage device 119 the latest subscriber demand information by title in the FVOD service and NVOD service, and outputs the information in the format of, for example, a histogram to a printing device such as a printer, a monitor screen of a display device, etc.

The subscriber demand information such as the number of subscriber for a title, etc. stored in the storage device 119, can be updated by a demand monitoring mechanism 116. That is, when the demand monitoring mechanism 116 detects the end of the broadcast of a video in the FVOD service or NVOD service, it decrements by 1 the number of subscribers for that video stored in the storage device 119. Thus, the storage device 119 stores the latest subscriber-demand-by-title information for each of the FVOD service and NVOD service. Accumulating the information enables the number of subscribers in each year, month, day, and broadcast time, to be recorded corresponding to each title.

Normally, the number of subscribers increases in the VOD service in the evening through midnight, and on holidays. Therefore, the load on the management/control server 110 by dynamically switching from the FVOD service to the NVOD service through the busy management can be reduced by preliminarily and statically switching, depending on specific days and times, to the NVOD service. The subscriber can view the static switch as if the switch were made through the busy management determination on the CATV center 100 side, thereby creating no unfamiliar feeling for the subscribers.

The switch of the services from the FVOD service to NVOD service can be made depending on the use of the video distributing channels. In this example, the number of the video distributing channels for broadcasting video in the NVOD service is preliminarily fixed, and the service is automatically switched from the FVOD service to NVOD service when the number of unused video distributing channels reaches the predetermined value.

According to the above described embodiment, the CATV system realizes a video-on-demand service. However, the present invention is not limited to this application but can be applied to a telephone network other than the CATV network, a direct satellite broadcast, or an interactive information communications system through other communications network, for example, a wireless cable, etc.

Furthermore, according to the above described embodiment, the video server comprises a plurality of VOD servers 120. The present invention can also be applied to, for example, other computers such as a general-purpose computers, and to various hardware configurations such as a private unit.

What is claimed is:

1. A video data distributing device having at least one video server including a video data storage device for storing video data and a streaming unit reading the video data from the video data storage device to perform a video streaming process on the video data, said video data distributing device providing a subscriber with a video-on-demand service at a request from the subscriber, comprising:

a load state management unit managing a load in a process of each video server and determining if spare capacity exists on the video server;

a full-video-on-demand service providing unit providing a requested video data through a full-video-on-demand service which broadcasts the video data stored in the video data storage device along one channel, wherein the broadcasted video data is played upon a request of the subscriber;

a near-video-on-demand service providing unit providing said requested video data through a near-video-on-demand service which broadcasts the video data stored in video data storage device along plural channels at predetermined time intervals;

a service switch determining unit determining, upon receipt of a request to watch a video from the subscriber, whether a broadcast of the requested video is to be serviced in the full-video-on-demand service or the near-video-on-demand service depending on management information managed by said load state management unit including whether spare capacity exists on the server as determined by said load state management unit; and a broadcast unit broadcasting the requested video by said full-video-on-demand service providing unit or said near-video-on-demand service providing unit for the subscriber according to a determination result from said service switch determining unit.

2. The video data distributing device according to claim 1, wherein said load state management unit manages a number of video programs being processed by each video server; and said service switch determining unit switches a service for the subscriber from the full-video-on-demand service to the near-video-on-demand service when the requested video is newly broadcast and the number of the video programs managed by said load state management unit exceeds a predetermined threshold.

3. The video data distributing device according to claim 1, wherein said load state management unit manages a number of video programs being accessed by the streaming unit in each video server and stored in the video data storage device; and said service switch determining unit switches a service for the subscriber from the full-video-on-demand service to the near-video-on-demand service when the requested video is newly broadcast and the number of the video programs managed by said load state management unit exceeds a predetermined threshold.

4. The video data distributing device according to claim 1, wherein said load state management unit manages a number of current subscribers to each video whose data is stored in the video data storage device in each video server; and said service switch determining unit switches a service for the subscriber from the full-video-on-demand service to the near-video-on-demand service when the requested video is newly broadcast and the number of the subscribers managed by said load state management unit exceeds a predetermined threshold.

5. The video data distributing device according to claim 1, further comprising:

a subscriber number management unit managing a number of subscribers watching in the near-video-on-demand service each video whose data is stored in the video data storage device in each video server, wherein said broadcast unit stops broadcasting the video according to management information managed by said subscriber number management unit when it is determined that no subscriber is watching the video being broadcast in the near-video-on-demand service.

6. The video data distributing device according to claim 1, further comprising:

a title selection control unit providing an interactive inputting operation for selecting a title of a video requested and displayed on a monitor of a receiving terminal device on a subscriber side in a same format in the full-video-on-demand service and the near-video-on-demand service.

7. The video data distributing device according to claim 1, further comprising:

a subscriber storage unit storing a list of subscribers when a video is to be broadcast after being switched to the near-video-on-demand service by said service switch determining unit and when another subscriber issues a request to watch the video before an actual broadcast of the video after switching to the near-video-on-demand service, wherein said broadcast unit provides said list of subscribers stored in said subscriber storage unit with the video in the near-video-on-demand service.

8. The video data distributing device according to claim 7, wherein said subscriber storage unit stores the list of subscribers in the order in which requests are received.

9. The video data distributing device according to claim 1, further comprising:

a subscriber-demand-by-title storage unit receiving service switch information from said service switch determining unit and storing the number of subscribers of a video whose data is stored in the video data storage device of each video server separately for the full-video-on-demand service and the near-video-on-demand service.

10. A video data distributing device having at least one video server including a video data storage device for storing video data and a streaming unit reading the video data from the video data storage device to perform a video streaming process on the video data, said video data distributing device providing a subscriber with a video-on-demand service at a request from the subscriber, comprising:

a load state management unit managing a load in a process of each video server and determining if spare capacity exists on the video server;

a full-video-on-demand service providing unit providing a requested video data through a full-video-on-demand service which broadcasts the video data stored in the video data storage device along one channel, wherein the broadcasted video data is played upon a request of the subscriber;

a near-video-on-demand service providing unit providing said requested video data through a near-video-on-demand service which broadcasts the video data stored in the video data storage device along plural channels at predetermined time intervals;

a first service switch determining unit determining, upon receipt of a request to watch a video from the subscriber, whether a broadcast of the requested video is to be serviced in the full-video-on-demand service or the near-video-on-demand service depending on management information managed by said load state management unit including whether spare capacity exists on the server as determined by said load state management unit;

a second service switch determining unit determining, upon receipt of a request to watch a video from the subscriber, whether a broadcast of the requested video is to be serviced in the full-video-on-demand service or the near-video-on-demand service depending on a reception time; and a broadcast unit broadcasting the requested video by said full-video-on-demand service providing unit or sail near-video-on-demand service providing unit to the subscriber according to a determination result from either said first or second service switch determining unit.

11. The video data distributing device according to claim 1, further comprising:

a service information broadcast unit broadcasting various service information to the subscriber after switching by said service switch determining unit a broadcast of a video from the full-video-on-demand service to the near-video-on-demand service until an actual broadcast of the video starts in the near-video-on-demand service.

12. A video data distributing method, comprising:

determining, at a request from a subscriber for a video-on-demand service, whether or not video data can be provided in a full-video-on-demand service which broadcasts the video data stored in the video data storage device along one channel, wherein the broadcasted video data is played upon a request of the subscriber; and providing the video data in a near-video-on-demand service which broadcasts said video data stored in the video data storage device along plural channels at predetermined time intervals, when the video data cannot be provided in the full-video-on-demand service.

13. A video data distributing device to transmit video programs to subscribers having at least one video server, comprising:

a load state management unit to determine a load and whether any excess capacity exists on said video server by monitoring the number of video programs being broadcast and the number of subscribers viewing each of the video programs being broadcast;

a full-video-on-demand service providing unit providing a requested video data through a full-video-on-demand service which broadcasts the video data stored in the video server along one channel, wherein the broadcasted video data is played upon a request of a subscriber;

a near-video-on-demand service providing unit providing said requested video data through a near-video-on-demand service which broadcasts a the video data stored in the video server along plural channels for near video on demand at predetermined time intervals;

a service switch determining unit to receive program requests from said subscribers, to determine to provide the video program immediately via full-video-on-demand service to the subscribers when the load determined by said load state management unit indicates that excess capacity on the video server exists, and to determine to provide the video program at a later time period using a near-video-on-demand service when the load determined by said load state management unit indicates that insufficient capacity exists in said video server for the full-video-on-demand service; and a broadcasting unit to transmit the video program immediately along the one channel for full video on demand when said service switch determining unit determines to provide the video program via the full-video-ondemand service and to broadcast the video program in the later time period along the plural channels for near video on demand when said service switch determining unit determines to provide the video program via the near-video-on-demand service.

14. A method of distributing video data over a video server, comprising:

receiving a program request from a subscriber;

determining whether spare capacity exists on the video server to deliver the program requested to the subscriber in full video on demand;

transmitting a requested video data, corresponding to the program, stored in the video server immediately to the subscriber along one channel for full video on demand when spare capacity exists on the video server;

informing the subscriber of a viewing time for the program in near video on demand when spare capacity does not exist on the video server, the viewing time included in plural viewing times separated by corresponding predetermined time intervals;

determining if the subscriber agrees to receive the program at the viewing time in near video on demand when spare capacity does not exist on the video server; and broadcasting said requested video data stored in the video server along plural channels for near video on demand upon arrival of the viewing time when the subscriber agrees to receive the program in near video on demand at the viewing time.

* * * * *